H. HANSON.
COMBINED TYPE WRITING AND COMPUTING MACHINE.
APPLICATION FILED MAY 11, 1911.

1,278,812.

Patented Sept. 10, 1918.
15 SHEETS—SHEET 1.

WITNESSES:
J. A. Brophy
G. S. Young

INVENTOR:
Hans Hanson
BY
B. C. Stickney
ATTORNEY.

H. HANSON.
COMBINED TYPE WRITING AND COMPUTING MACHINE.
APPLICATION FILED MAY 11, 1911.

1,278,812.

Patented Sept. 10, 1918.
15 SHEETS—SHEET 2.

WITNESSES:
J. A. Brophy
F. S. Young

INVENTOR:
Hans Hanson
BY D. C. Stickney
ATTORNEY

H. HANSON.
COMBINED TYPE WRITING AND COMPUTING MACHINE.
APPLICATION FILED MAY 11, 1911.

1,278,812.

Patented Sept. 10, 1918.
15 SHEETS—SHEET 4.

WITNESSES:

INVENTOR:
Hans Hanson
BY
ATTORNEY.

H. HANSON.
COMBINED TYPE WRITING AND COMPUTING MACHINE.
APPLICATION FILED MAY 11, 1911.

1,278,812.

Patented Sept. 10, 1918.
15 SHEETS—SHEET 5.

WITNESSES:
J. A. Brophy
G. S. Young

INVENTOR:
Hans Hanson
BY
B. C. Stickney
ATTORNEY

H. HANSON.
COMBINED TYPE WRITING AND COMPUTING MACHINE.
APPLICATION FILED MAY 11, 1911.
1,278,812.
Patented Sept. 10, 1918.
15 SHEETS—SHEET 6.
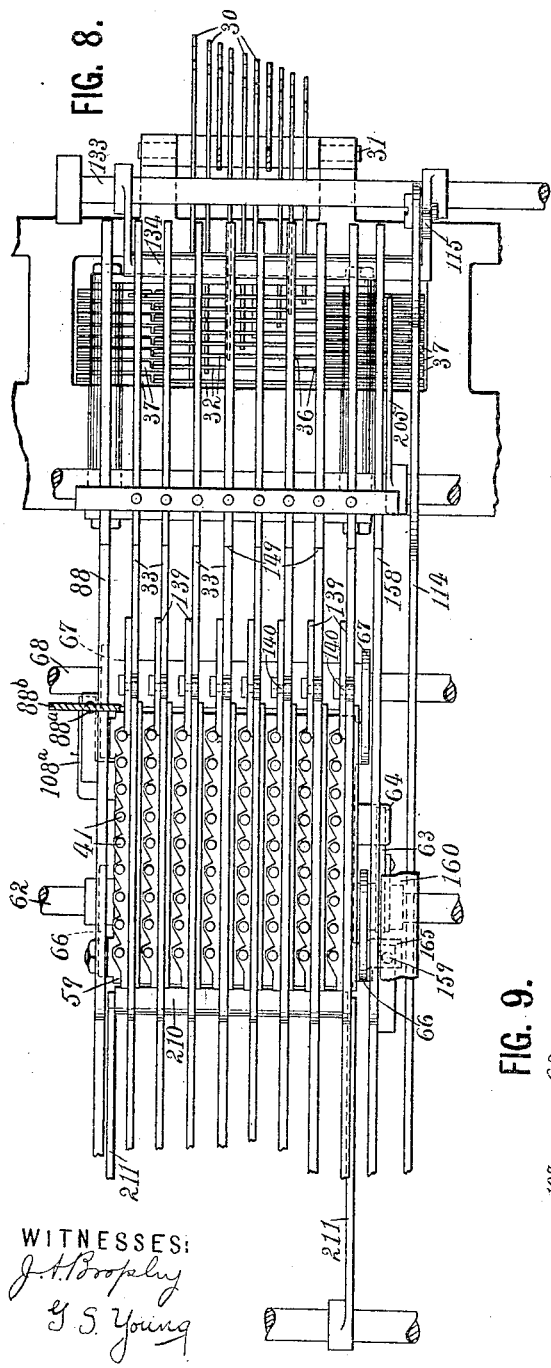
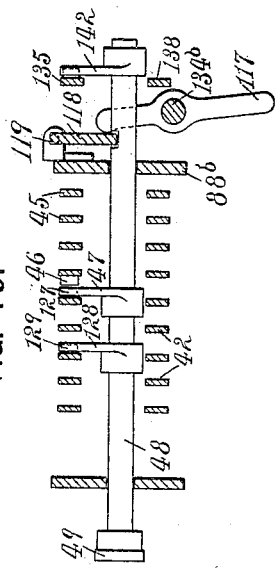
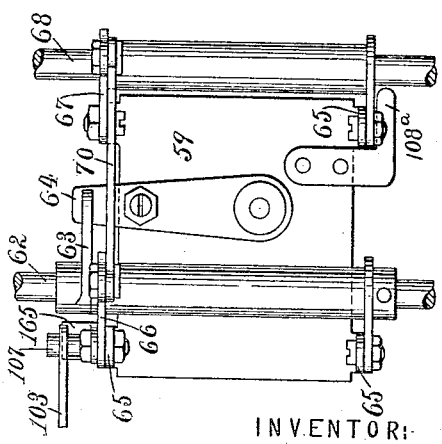

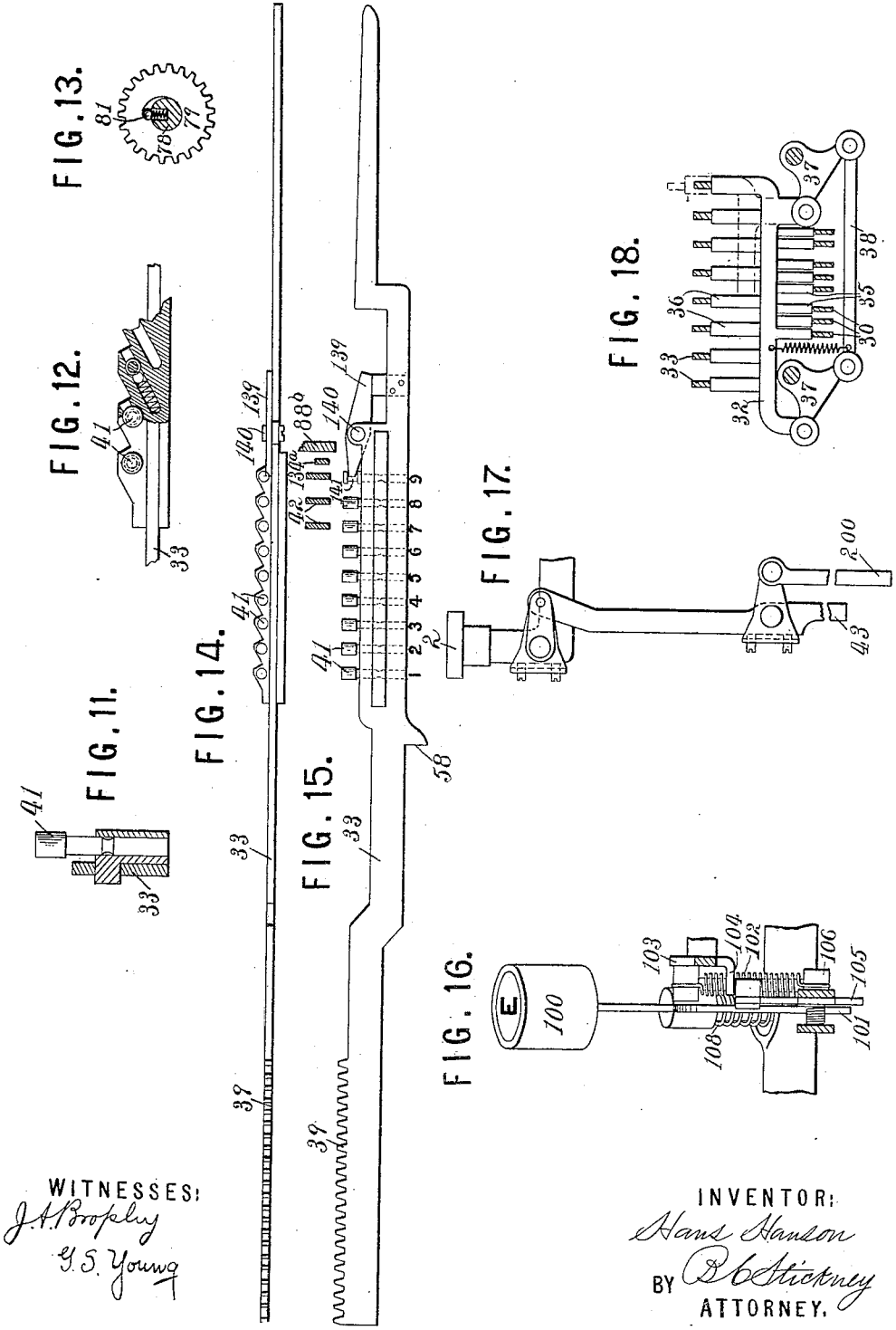

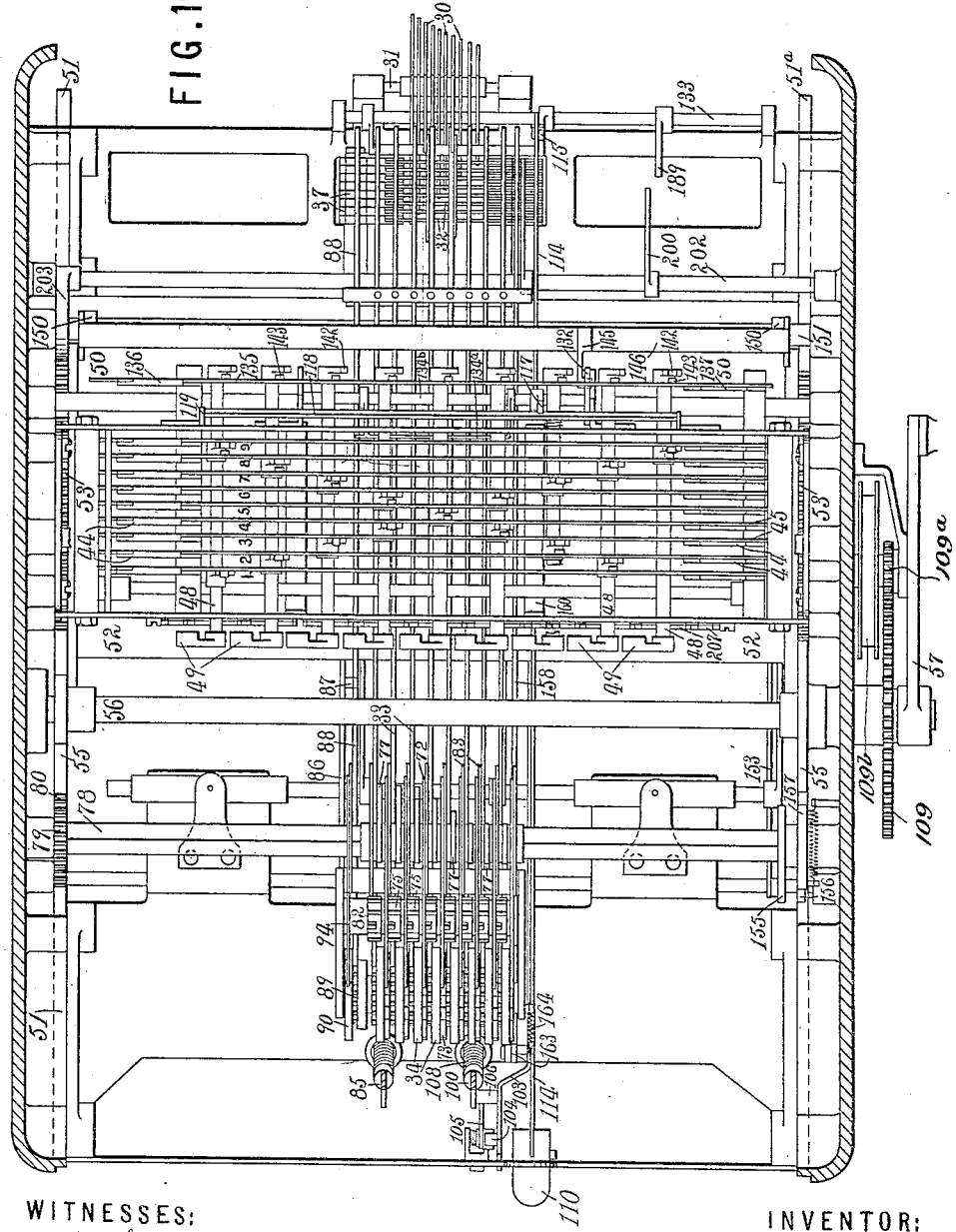

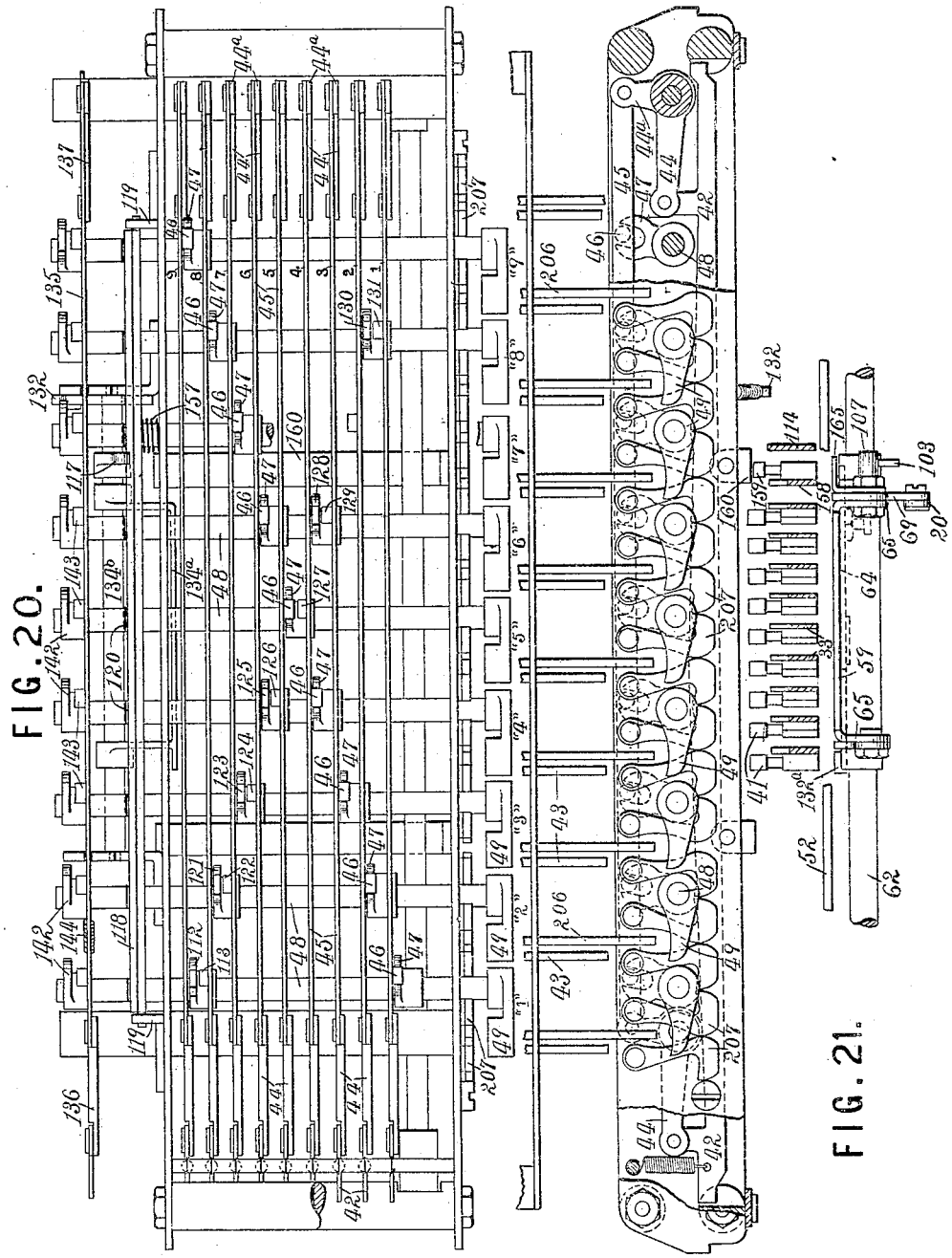

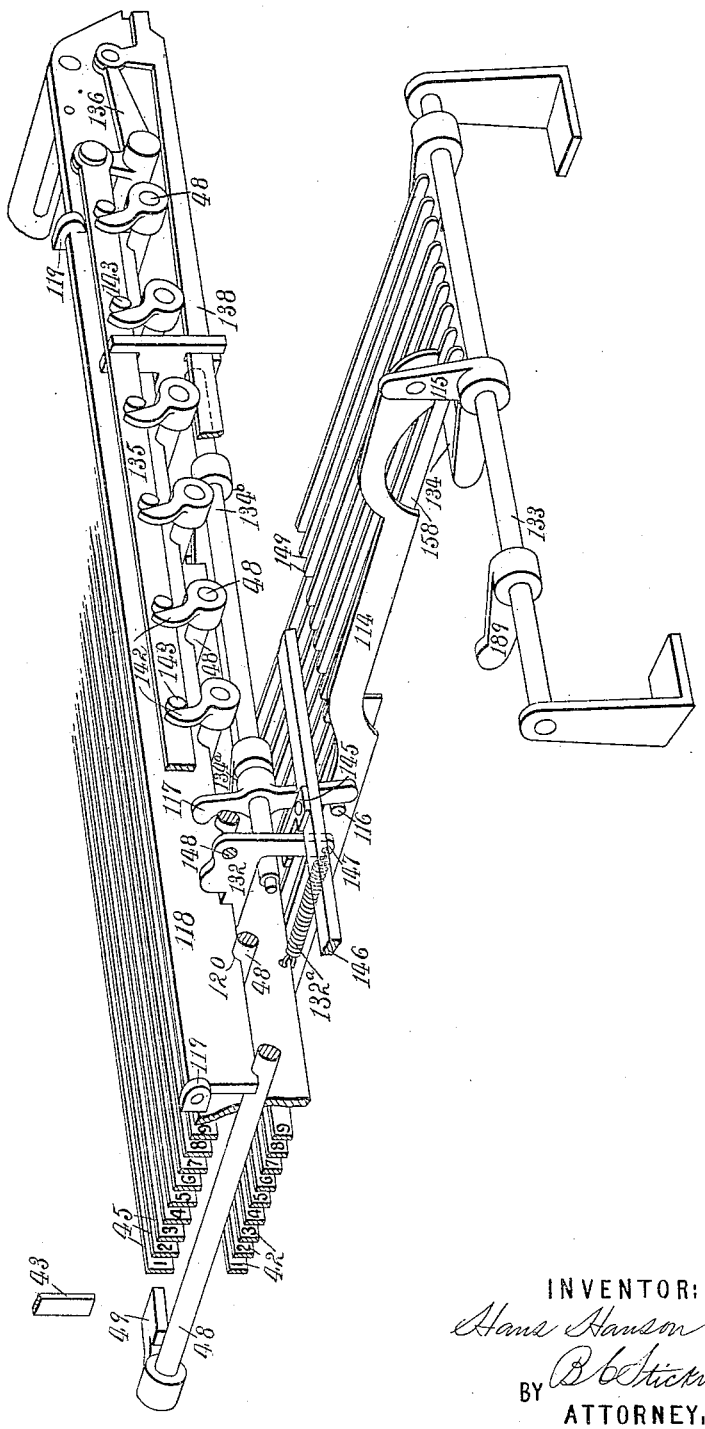

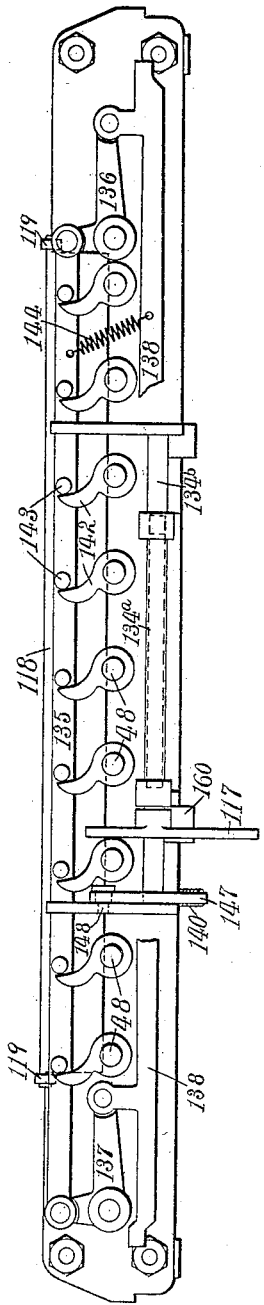

H. HANSON.
COMBINED TYPE WRITING AND COMPUTING MACHINE.
APPLICATION FILED MAY 11, 1911.

1,278,812.

Patented Sept. 10, 1918.
15 SHEETS—SHEET 12.

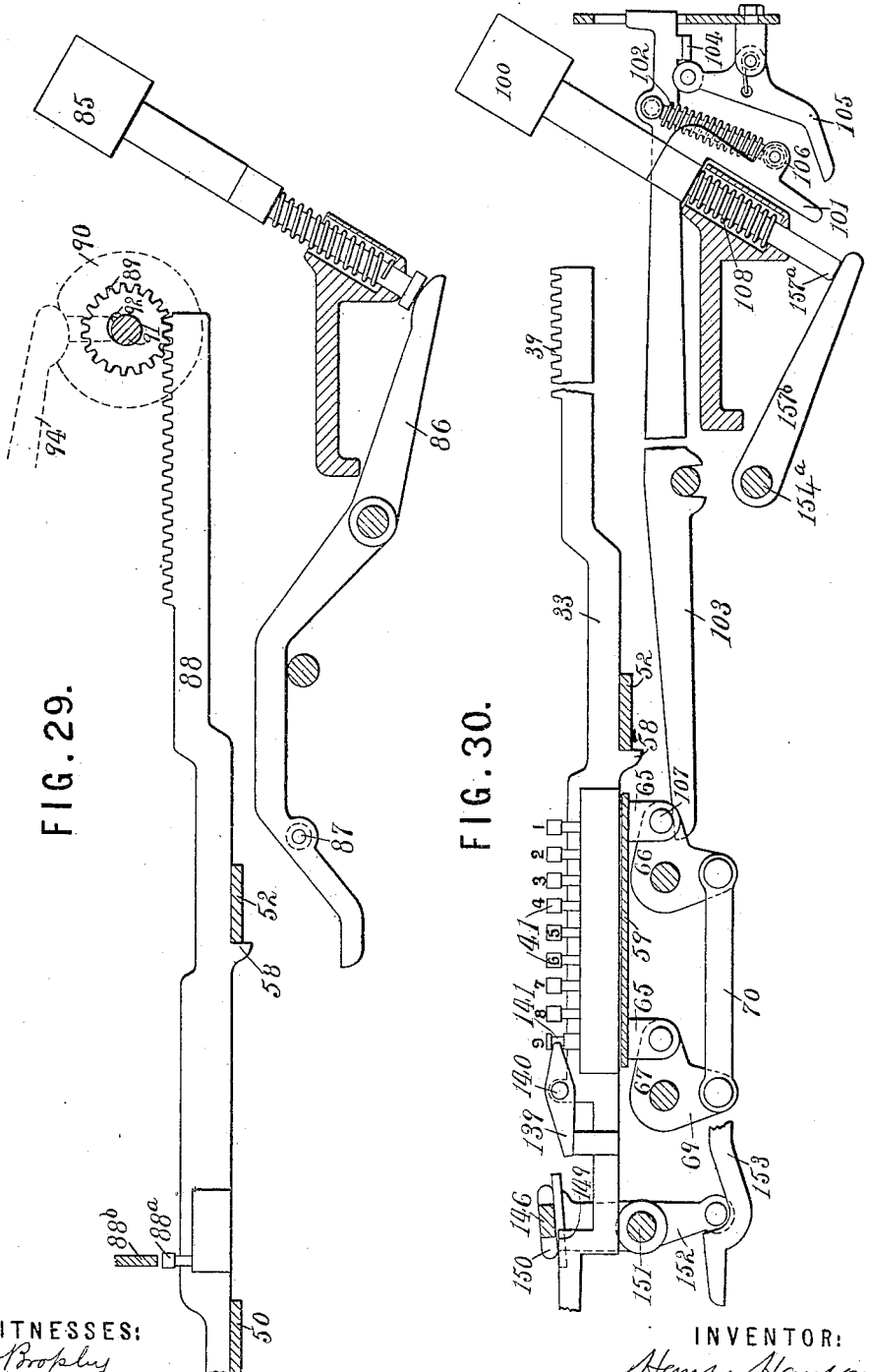

H. HANSON.
COMBINED TYPE WRITING AND COMPUTING MACHINE.
APPLICATION FILED MAY 11, 1911.

1,278,812.

Patented Sept. 10, 1918.
15 SHEETS—SHEET 14.

WITNESSES:
J. A. Brophy
Y. S. Young

INVENTOR:
Hans Hanson
BY B. C. Stickney
ATTORNEY

H. HANSON.
COMBINED TYPE WRITING AND COMPUTING MACHINE.
APPLICATION FILED MAY 11, 1911.
1,278,812.
Patented Sept. 10, 1918.
15 SHEETS—SHEET 15.
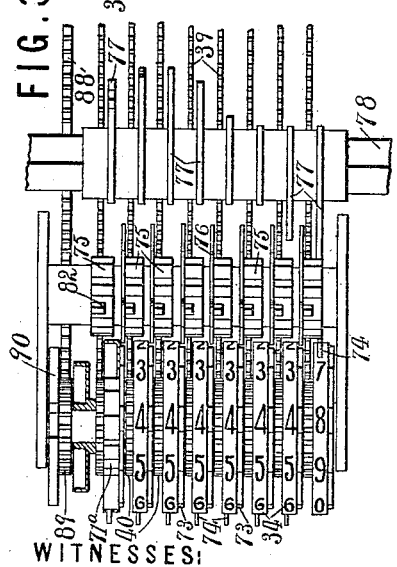
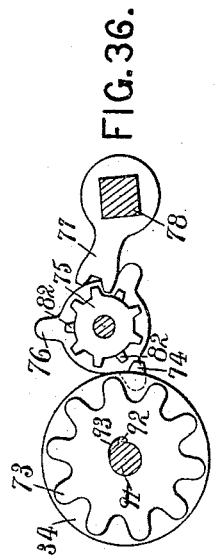
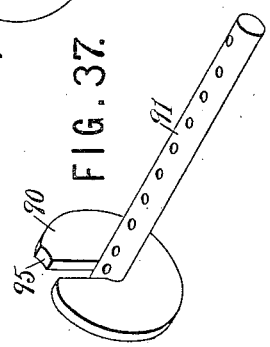
INVENTOR:
Hans Hanson
BY
D. B. Stickney
ATTORNEY.

UNITED STATES PATENT OFFICE.

HANS HANSON, OF HARTFORD, CONNECTICUT, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,278,812.      Specification of Letters Patent.     Patented Sept. 10, 1918.

Application filed May 11, 1911. Serial No. 626,550.

*To all whom it may concern:*

Be it known that I, HANS HANSON, a citizen of the United States, residing in Hartford, in the county of Hartford and State of Connecticut, have invented certain new and useful Improvements in Combined Type-Writing and Computing Machines, of which the following is a specification.

This invention relates to adding or computing machines, particularly of that type in which numeral keys are caused to set pins or devices which determine the rotation of the number wheels or devices; the latter being actuated by a general operator or prime mover after the operation of the numeral keys.

The principal object of the invention is to provide practicable means for performing subtraction in machines of this general character. The number wheels in such machines are usually constructed to turn in only one direction, and by means of my invention it is practicable to perform subtraction by advancing the wheels in the same direction.

In the preferred form of the invention, I provide a subtraction key, which is pressed by the operator, whenever he desires to adjust the machine so that it will perform subtraction instead of addition. When the invention is carried out in the manner illustrated in the drawings, the operation of said subtraction key will set the "9" pins for all the number wheels, thus providing that every wheel shall be turned at least nine steps at the subsequent movement of the general operator, unless one or more of the set "9" pins are restored and other pins set instead thereof. The mechanism controlled by the numeral keys is affected by said subtraction key in such a manner that any numeral key, when setting its pin, automatically restores the previously set "9" pin. By reason of an additional function of the subtraction key, the numeral keys are caused at the subtraction operation to set complementary pins, or at least each key is caused to set a pin whose value is one less than the complement of the operated key. For instance, if key "2" is depressed it sets the pin "7," which is one less than the complement of 2. Hence, at the subsequent operation of the general operator, the number wheels are advanced each to an extent which is one less than the complement of the operated key; while such wheels as are not affected by the keys, are caused to advance nine steps. This occurs, according to the preferred form of the invention, during the initial stroke of the general operator. Another function of the general operator (when subtracting) is to advance the units wheel one extra step; and it will be readily seen that this may bring into action the tens-carrying mechanism. And the movement of the tens-carrying train, which preferably takes place during the return stroke of the general operator, may proceed along the whole gang of number wheels, so that at the completion of the operation, certain of said wheels will show at the sight hole numbers which are the full complements of the operated keys, while others of said wheels (having merely performed a complete revolution) will show the same numbers as before the subtraction operation. Further particulars and illustrations of the operation of the number wheels will be given hereinafter.

Heretofore it has been suggested to perform subtraction by adding the complement of the subtrahend, but the difficulty has been encountered that such addition of complement involves the carrying of "10" over to the wheel of next higher denomination, so that for instance if it were attempted to take "4" from "19" the result would show as "25." This difficulty is overcome by my invention, since the carrying of "10" to the next higher wheel (which has already been advanced idly 9 steps) merely serves to complete an entire revolution of the latter, so that it reads the same as before the subtraction operation. Thus I automatically cancel the effect of spurious tens-carrying that occurs when subtracting by means of the addition of complements.

At the completion of the subtraction operation, the machine is preferably restored automatically to condition to perform addition.

Provision is also made whereby, after the subtraction key has been operated, the usual error key may be employed to restore the machine to condition to perform addition, as well as to restore any pins that may have been set.

Provision is also preferably made, whereby the types are caused to strike through a ribbon of different color when a number is being subtracted.

The invention is illustrated in connection with the well known Underwood combined typewriting and adding machine of the Hanson type illustrated in Patents 816,319 and 905,421-2, and in other pending applications, in which only nine numeral keys are employed, and in which said keys are connected directly to the types; but it will be understood that the invention may be applied to a wide variety of adding machines whether connected or not to typewriter mechanisms, and the invention is not limited to a machine in which only nine numeral keys are employed.

Other objects and advantages will hereinafter appear.

In the accompanying drawings,

Fig. 8 is a plan of the wheel-rotating rack bars, and the nest of pins carried thereon.

Fig. 9 is a bottom view of a plate connected to the error key and also to the general operator, whereby is effected the restoration of any pins that may have been set.

Fig. 10 is a sectional elevation taken from front to rear, showing the relation between the pin-setting bars, and one of the key-controlled shaft-carrying arms which coöperates with said bars; the shaft being shown as shifted endwise to subtracting position; an arm on the rear end of said shaft being in the position to operate a bar that restores any previously set "9" pin.

Fig. 11 is a sectional elevation, and Fig. 12 is a part-sectional plan, to show details of the settable pins and mounts therefor.

Fig. 13 shows a ball clutch usually employed between a pinion, which is connected to the reciprocatory general operator, and a shaft whereon is mounted a set of segments forming part of a tens-carrying train.

Fig. 14 is a plan and Fig. 15 an elevation of one of the wheel-operating rack bars.

Fig. 16 is a front elevation of the forward portion of the error-key mechanism.

Fig. 17 is a side elevation of a type-operating numeral key.

Fig. 18 is a rear elevation of the linkages forming part of the mechanism which selects the rack bars to operate the number wheels.

Fig. 19 is a general plan of the computing mechanism.

Fig. 20 is a plan of a nest of pin-setting linkages, and shows crossed rows of key-controlled rack-arms shiftable from one set of linkages to another in order to effect subtraction.

Fig. 21 is a front elevation of the devices seen at Fig. 20, showing also the settable pins and the pin-restoring plate.

Fig. 22 is a rear perspective view of the pin-setting linkages, pin-carrying rack bars, etc.

Fig. 23 is a rear elevation of a linkage that restores any set "9" pin whenever any numeral key is operated at the subtraction operation; the parts being in normal positions.

Fig. 24 is a view similar to Fig. 23, but showing a linkage as having been operated to restore a previously set "9" pin. It will be understood that before the operation of said linkage, the part depressed thereby occupied the position shown in dotted lines.

Fig. 25 is a sectional side elevation of a portion of the bichrome ribbon mechanism of an Underwood typewriter.

Fig. 26 is a side elevation of a portion of a pin-carrying wheel-operating rack bar, illustrating the setting of one pin at the subtraction operation, and the simultaneous restoration of the previously set "9" pin, as at Fig. 24.

Fig. 29 is an elevation of the principal portion of the mechanism for re-setting the wheels to zero.

Fig. 30 is a sectional elevation of the mechanism for correcting errors, that is, for restoring to normal positions the set pins, the subtraction devices, etc.

Fig. 34 is a plan of one of number wheels and a tens-carrying train.

Fig. 35 is a sectional side elevation of the same.

Fig. 36 is a view similar to Fig. 35, but illustrating the method of operation of the tens-carrying train.

Fig. 37 is a perspective view of an arbor on which are mounted the computing wheels, showing particularly part of the means whereby the wheels are returned to zero.

Fig. 38 is a sectional side elevation of a portion of the mechanism for returning the wheels to zero.

Fig. 39 is a side elevation on a larger scale of one of the number wheels and its appurtenances.

Fig. 40 is a sectional view of the same.

Figure 1:
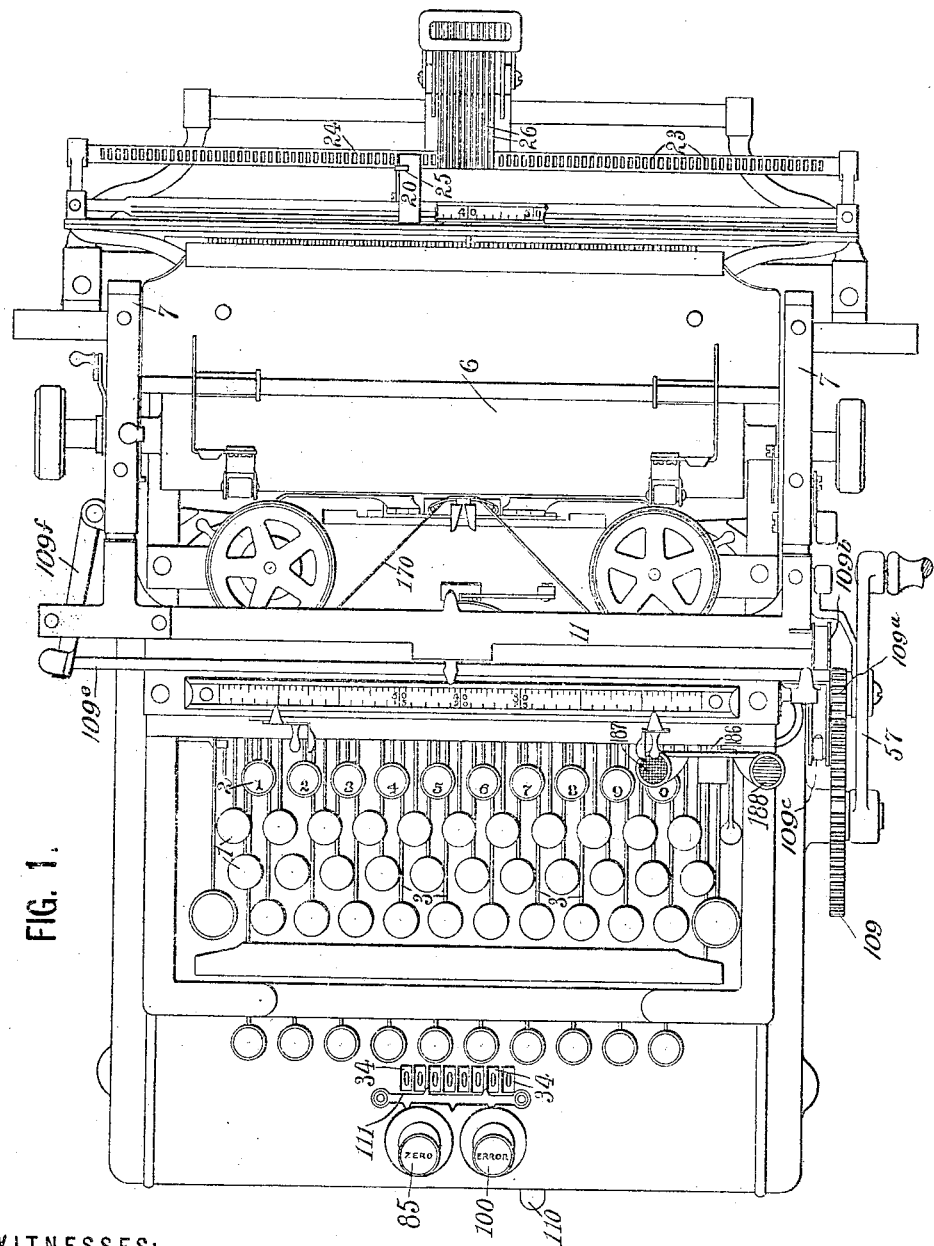
Figure 1 is a plan view of an Underwood combined typewriting and adding machine of the Hanson type, embodying the present improvements.

In the Underwood-Hanson combined typewriting and adding machine, illustrated in the drawings, alphabet keys 1 and numeral keys 2 (Fig. 2) operate to depress levers 3, to vibrate bell cranks 4 to swing type bars 5 upwardly and rearwardly against a platen 6. The platen shifts to permit different types to print, being mounted in a vertically shiftable platen-frame 7 having a roll 8 to run on a shift-rail 9. The platen frame is connected by arms 10 to a non-shifting letter-feeding carriage 11; said arms mounted on a rock shaft 12, which is journaled in said carriage, permitting the platen frame 7 to shift up and down. Said carriage 11 has a rack 12ª, meshing with a pinion 13 forming part of a letter-feeding mechanism. The carriage is driven by a spring barrel 14 and strap 15, Fig. 3. Each type bar has a heel 16 to operate a universal bar 17, which controls dogs 18 to coöperate with an escapement wheel 19 connected to said pinion 13, so that as every type key is operated, the carriage 11 is fed a letter-space.

Referring to Figs. 1, 2, 3, 32 and 33, on rock shaft 12 are rigidly mounted two rearwardly extending arms supporting a rod on which is rotatably mounted denomination selecting tappets 20, adjustable along said rod, and capable of being locked in any desired position by means of a tooth 22 engaging one of a series of notches 23 formed in a rack bar 24, also carried by said arms.

Each tappet 20 has a tooth 25 to engage consecutively with jacks 26 and lift the latter; the tooth being beveled or cam-shaped for this purpose, and the jacks being correspondingly shaped. The jacks are levers pivoted upon a rod 27 fixed on the framework; and, when actuated by tooth 25, each jack depresses one of a series of thrust rods 28, Figs. 2, 3, 5, 7. These jacks and thrust-rods are employed for the purpose of selecting the computing wheels to be operated, or of determining the denomination of the number which is to be added, or in other words, of determining the place in a column in which computing is to be effected. The first jack to be operated by the tappet 20, as the carriage runs in letter-feeding direction, is the jack of highest denomination, for instance millions.

The connection from the jacks to the computing wheels is as follows: The rods 28 at their lower ends are pivoted at 29 to levers 30, (Figs. 5, 7, 8, 18, 19) the latter pivoted loosely between their ends upon a fixed rod 31, and extending forwardly therefrom beneath a set of links 32, overlying which are forwardly extending denominational or column-selecting rack bars 33 for operating the computing wheels 34 at the front of the machine. Said links 32 have pendent stems 35 to be engaged and lifted by the forward ends of the levers 30, and also rising stems 36 to engage and lift the wheel-operating rack bars 33. Each of said links 32 forms a member of a linkage; the other members of which comprise diagonal links 37 and a connecting link 38; whereby each link 32 is caused to rise about vertically. These linkages serve to form crossconnections between the jacks 26 and the rack bars 33; the denominational order of the latter being the reverse of that of the former; the jack 26 of highest denomination at Fig. 1 being at the right of the series, while the computing wheel 34 of highest denomination is at the left of the series.

Figure 5:
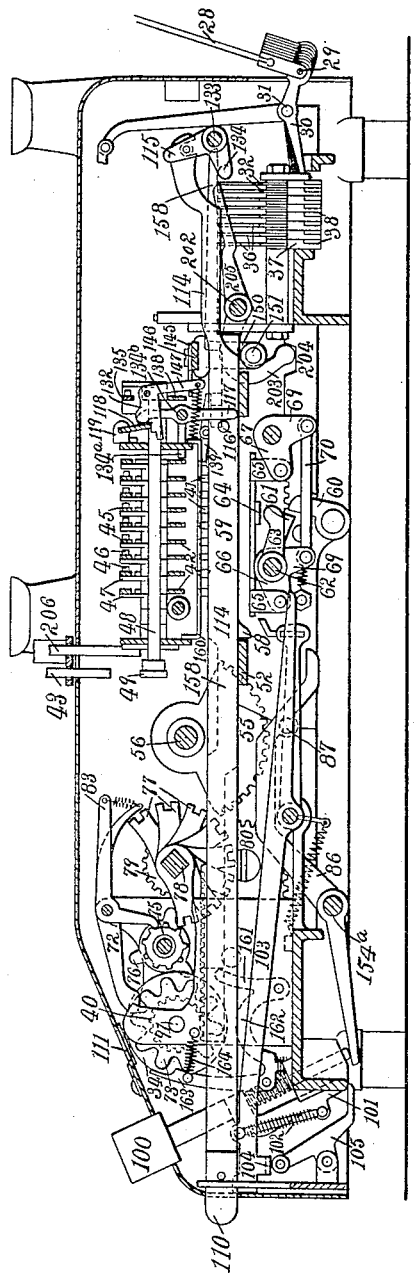
Fig. 5 is a sectional elevation from front to rear of the principal portions of the wheel-operating mechanism.

Each of the rack bars 33 carries at its forward end teeth 39 to mesh with a pinion 40 with which each of the computing wheels 34 is provided, Figs. 5, 35 and 39.

The effect that each jack 26 has on its associated rack bar 33 is to lift the rear end of the latter, while the other rack bars remain in normal positions; and the purpose of lifting or selecting the rack bar is to permit the setting of any selected one of a forwardly extending row of pins 41 thereon; the pins being set by means of said numeral keys 2.

Said numeral keys are connected respectively to transverse pin-setting bars 42 overlying the pins 41, but incapable of reaching the latter when the rack bars 33 are down in normal positions; but if any rack bar is lifted by its jack 26, in the manner already explained, then the depression of any numeral key 2 (the carriage 11 remaining stationary) will cause the corresponding setting-bar 42 to descend and engage the underlying pin 41, to force the latter to project down below the lower edge of its rack bar 33. This downwardly-projecting pin then serves as a lug, by which the rack bar is driven forwardly to rotate its associated computing wheel in a manner that will presently be explained.

When the carriage 11 is moved to such a position that a tappet 20 is in the field of the jacks 26, and one of the latter is lifted by the tappet, if a key 2 be depressed, it will push down a stem 43, (Figs. 7, 17, 21) to operate a linkage, whereof said pin-setting bar 42 constitutes a member. There are nine pins 41 (marked "1" to "9") on each rack 33, forming a row extending longitudinally of said rack bar; and the pins on all the rack-bars taken together form rows extending crosswise of the machine, a bar 42 overlying each row. Each bar 42, as seen best at Fig. 21, forms a link between opposite bell-cranks 44; being connected to horizontal arms of said bell cranks; the vertical arms 44ª of said bell cranks are connected by horizontal links 45; these links 45 having wrists 46, engaged by slotted arms 47 fixed upon forwardly-extending rock shafts 48, carrying horizontal rock arms 49 just beneath and in position to be engaged by the descending key stems 43, Figs. 20 and 21. The manner in which each of the pin-setting bars 42 overlies a transverse row of settable pins 41 is clearly illustrated at Figs. 5, 7 and 21. The linkages 42, 44 and 45 are marked "1" to "9" and form a nest extending horizontally across the machine overlying the pins 41 and their rack bars 33. The foremost of these linkages is operated by the numeral key 1, the next rear linkage is operated by the numeral key 2, the next by the numeral key 3, and so on; there being nine of the linkages. The forward pin-setting bar 42 being, as just explained, operated by the numeral key 1, is capable of depressing the foremost pin 41 on any of said rack bars 33. This pin is situated so far forward on said rack bar, that only a minimum stroke is given to the latter by a subsequent operation of the machine; and hence the associated computing wheel 34 is turned a minimum distance, that is, one-tenth of a revolution.

The device that carries the rack bars forward is a horizontal bar 50, which is caused to move horizontally forward and pick up the rack bars 33 by means of the projected pins 41, so that the strokes of the several rack bars, and hence of their associated computing wheels, depend upon which pin in each rack bar was depressed, or in other words which numeral key was operated. The tappet 20 on the carriage selects the wheel, and any numeral key 2 may determine the extent of rotation of the selected wheel. Upon the return of key 2, the carriage 11 feeds, and the tappet 20 lifts the next lower jack 26.

Figure 27:
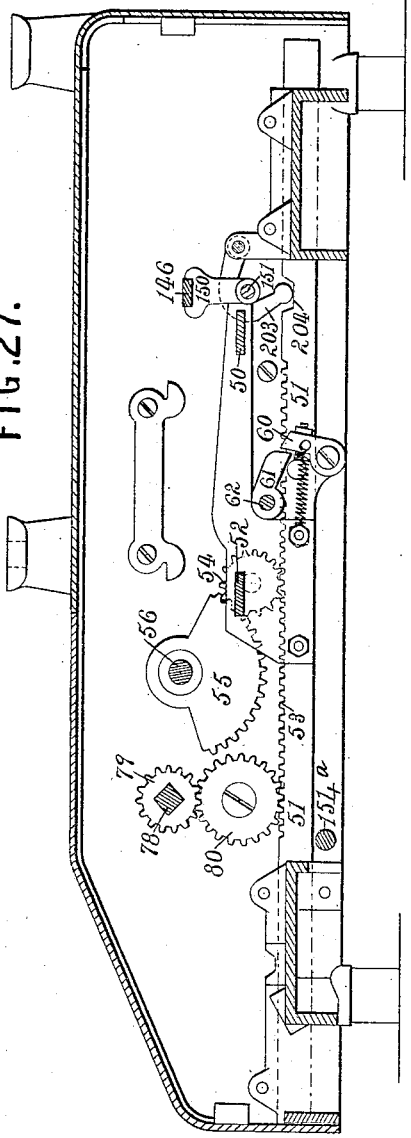
Fig. 27 is a sectional elevation from front to rear of the parts at the left-hand portion of the computing machine, showing them in normal positions.
Figure 28:
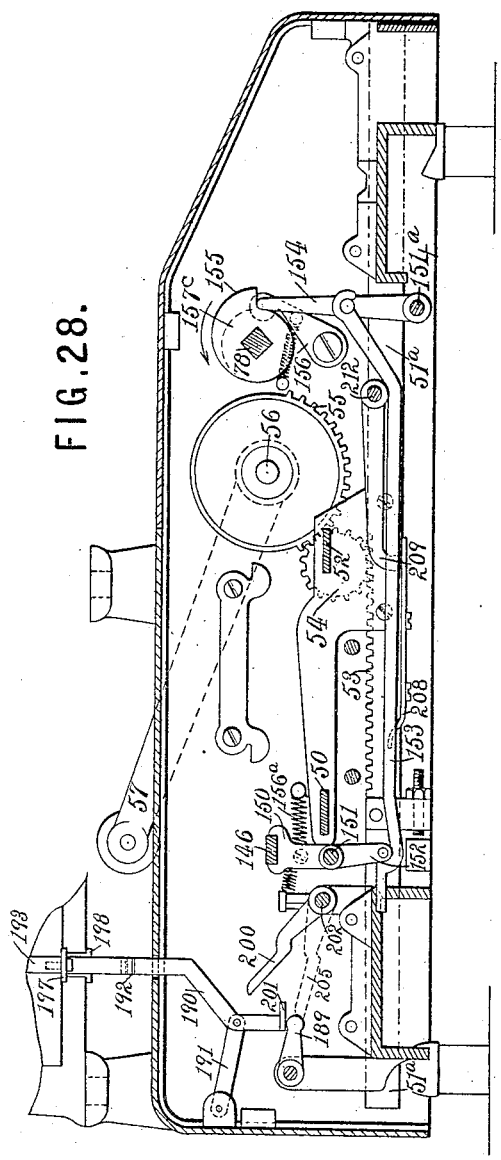
Fig. 28 is a sectional elevation of the parts at the opposite side of the machine base, in normal positions.

Said horizontal bar 50 forms a part of a "general operator," which also comprises a pair of slides 51, 51ª, at opposite sides of the machine, (Figs. 19, 27, 28) mounted in suitable guides or tracks upon the base and rigidly connected by said bar 50, as well as by a forward cross-bar 52 just beneath the rack bars 33; the slides and the bar taken together forming a movable frame or carriage, and constituting the general operator of the computing wheels. These slides are formed with racks 53, to mesh with pinions 54 pivoted upon the side walls of the machine frame, said pinions in turn meshing with segments 55 fixed upon the opposite ends of a horizontal rock shaft 56 extending across the machine and carrying at its right hand end outside of the frame a long handle 57, which is swung forwardly from the Fig. 28 position to advance the general operator and cause the bar 50 to advance the rack bars 33, to turn the pinions 40 and computing wheels 34. Upon the return stroke of the handle 57, said cross bar 52 of the general operator engages shoulders 58 (Figs. 5, 7, 15, 30) formed upon the under sides of the rack bars 33 and returns them to normal rear positions.

During the last part of the return stroke of the general operator, a universal pin-restorer in the form of a horizontal plate or tablet 59 (Figs. 5, 7, 8, 9, 21) is caused to lift and restore all of the depressed pins 41 to their normal positions on the rack bars 33 (this being a function of said general operator). Said universal restoring plate is actuated by a cam 60 (Fig. 7), mounted upon the left hand slide 51 of the general operator to engage a rock arm 61 pendent from a horizontal rock-shaft 62, the latter extending across the machine and mounted in the side walls of the machine frame, and having near its middle an arm 63 to engage and lift a projection 64 provided on said universal pin-restoring plate 59. The latter is mounted for up and down parallel movement by means of forward and rear ears 65, which are pivoted to horizontal arms of bell cranks 66, 67, the former loosely mounted on said shaft 62 and the latter loosely mounted on a shaft 68 parallel with said shaft 62. Said bell cranks comprise pendent arms 69 which are connected by a link or links 70. At the last part of the return stroke of the general operator, the cam 60 engages the arm 61 and turns the shaft 62, causing arm 63 thereon to rise and lift said pin-restoring plate. It will be noticed that the cam 60 is pivotally mounted on said slide 51, to permit it to pass freely under the arm 61 during the forward stroke of the general operator.

When the racks are being returned rearwardly by bar 52 of the general operator, the pinions 40 turn idly, the latter having pawl devices 70ª to engage with ratchet wheels 71 (Fig. 39) fixed inside of the computing wheels 34, which rotate always in the same direction.

The computing wheels are held steady by spring detents 72, Fig. 5, which engage gears 73 fixed on the respective computing wheels; said gears 73 serving also as tens-carrying gears. The tens-carrying operation is initiated by special teeth 74 (Figs. 4, 35, 36, 39), one of which is fixed upon each of the computing wheels 34, in position to engage and operate once in each revolution of wheel 34 an adjacent tens-carrying pinion 75, the latter provided with a three-toothed gear 76 in position to mesh with and turn the gear 73 fixed on the computing wheel 34 of next higher denomination. Although the tens-carrying operation depends upon the actuation of a pinion 75 by the tooth 74 upon the computing wheel 34, still such tooth merely initiates the tens-carrying operation, the latter being completed by means of one of a series of power-driven rocking segments 77. There is one segment 77 for each of the computing wheels except the units wheel; and these segments are fixed upon a transverse horizontal shaft 78 which has at one end a pinion 79 (Figs. 5, 13, 27), the latter meshing with an idle pinion 80, which in turn meshes with the teeth 53 on the left-hand slide 51 of the general operator, so that the pinion 79 is rotated forwardly and backwardly about a complete revolution at each cycle of movements of said general operator. The tens-carrying segments, however, are intended to rotate only in one direction; and hence the shaft 78 on which they are fixed is connected by a ball or other clutch 81 with said pinion 79, so that the rotation of the pinion during the advance of the operator is an idle one; the segment shaft 78 being turned only during the return stroke of the operator. In other words, during the forward stroke of the general operator, the teeth 74 on certain of the computing wheels 34 operate to set the tens-carrying pinions 75, and during the back stroke of the operator, the segments 77 engage the pinions 75 and complete the tens-carrying operations by giving one-tenth of a revolution each to the corresponding computing wheels 34. The tooth 74 on each wheel 34 imparts to the tens-carrying pinion 75 one-ninth of a revolution; there being nine teeth on said pinion; and each segment 77 is intended to turn its pinion two-ninths of a revolution; each pinion being thus turned one-third of a revolution in all, in order to rotate the gear 73 and the next wheel 34 one-tenth of a revolution.

Every third tooth on each tens-carrying pinion 75 is cut away, a portion 82 being left, however, sufficient to be engaged by a spring detent 83; the tooth being cut away so that the tens-carrying segments 77 may swing idly past the tens-carrying pinions when the latter are idle; the gap between the teeth adjacent to the cut-away tooth being sufficient to permit the free movement of segment 77. The tooth 74 on any computing wheel 34, by moving the tens-carrying pinion 75 one-ninth of a revolution, turns said pinion into position for engagement by its associated segment 77 upon the next return movement of the general operator; whereby said pinion is advanced an additional two-ninths, and the wheel 34 of next higher denomination is turned one-tenth of a revolution. The segments 77 are arranged in spiral order on the shaft 78, so that tens carrying may proceed from low to high denominations throughout the gang of computing wheels during a single return stroke of the general operator, whereby all the wheels may be turned from "9" to "0" progressively during said operator stroke.

In order to return the computing wheels to zero, a key 85 is depressed, Figs. 1, 29, and its stem depresses the front end of a lever 86, the rear end whereof is provided with a wrist 87, which takes under and lifts the rear end of a special rack bar 88, which is similar to the rack bars 33, but is provided with only one settable pin 88ª similar to pins 41. Said pin 88ª encounters a fixed abutment 88ᵇ, and hence stops before the upward movement of the rack bar 88 is completed, or in other words, the pin is forced to project below the rack bar by the upward movement of the latter. Upon then pulling forward the handle 57, the cross bar 50 of the general operator is moved to engage said projecting pin 88ª and carry forward the special zero rack bar 88, the forward end of which has teeth to mesh with a pinion 89, which has a ball-clutch connection to a disk 90, the latter being fixed to an arbor 91 upon which all of the computing wheels 34 are loosely mounted, Figs. 35, 37 and 38. This arbor, which is given a full revolution by the general operator at the forward stroke of the handle 57, (since pin 88ª is placed one step to the rear of "9" pins 41) has a clutch connection with every one of the computing wheels 34, so as to bring the units wheel to zero point, and the remaining wheels to such positions that they all show "9" at the sight opening. The arbor 91 turns a full revolution; but all except the units clutch are set to such positions as to be capable of giving their computing wheels each only nine-tenths of a revolution. The units wheel 34, in thus being turned to the zero position, effects by means of its tooth 74, a ninth of a revolution of its associated pins - carrying pinion 75, thus turning the latter to an abnormal position, in which it is capable of being rotated by its associated segment 77 upon the return stroke of the general operator, as already explained. Said segment of course turns not only the tens-carrying pinion, but also the next higher computing wheel, and the tooth 74 upon the latter effects a partial revolution of the associated tens-carrying pinion 75, thus bringing the latter to position to be actuated by the next segment, as the return movement of the general operator continues. This second tens-carrying wheel turns the hundreds computing wheel to zero, and incidentally advancing the associated tens-carrying wheel, and so on, tens being carried from wheel to wheel throughout the series during the return stroke of the operator, so that at the conclusion of said return stroke all the wheels stand at zero.

The arbor 91 is arranged to be capable of turning all of the wheels except the units wheel only nine-tenths of a revolution, so that the tens-carrying mechanism, when it operates, will simply complete the turning of the wheels to zero. It will be seen (Figs. 35, 36 and 38) that said arbor 91 is connected to said computing wheels by spring-pressed balls 92, engaging suitable cutaways 93 formed in the computing wheels; the units ball being one-tenth of a revolution in advance of the remaining balls, for the purpose set forth. A detent 94, engaging a notch 95 in the disk 90, holds the latter and arbor 91 in normal position.

If an error is made, the operator presses an error key 100, Figs. 5, 30, the stem of which has an arm 101, to which is attached one end of a draw-spring 102, the upper end of said spring connected to a lever 103 having a projection 104 to rest upon the top of a trip 105. A wrist 106 on the descending arm 101 presses said trip aside to the Fig. 30 position, and allows the tension-spring 102 to pull down said lever. The rear end of the lever rises and engages a wrist 107 on one of the bell-cranks 66, and thereby lifts the universal pin-restoring plate or tablet 59, to return to normal positions any pins 41, 88$^a$ or other pins that may have been set. When the error key is released, a spring 108 returns it to normal position. An ear 108$^a$ on the plate 59 restores the pin 88$^a$ on the "zero" rack bar 88.

In the hereinafter mentioned Hart application is disclosed means for returning the typewriter carriage and effecting line-spacing of the platen preparatory to beginning a new line of writing or computation; said means comprising gear 109 (Figs. 1, 3 and 19) connected to general-operator handle 57, pinion 109$^a$ meshing with 109, winding-barrel 109$^b$ connected to said pinion, pull-strap 109$^c$ extending up from said barrel and over a guide-pulley 109$^d$ (Fig. 3), and across the machine at 109$^e$, being attached at its far end to the line-space lever 109$^f$, whereby the line-spacing of the platen is effected in the manner usual in the Underwood typewriting machine. The forward swing of the general-operator crank 57 not only actuates the register, and thereby carries into the wheels the number previously set up by the numeral keys, but also line-spaces the paper and returns the typewriter carriage 7, 11 to begin a new line of writing. The pull of the strap upon the line-space lever both operates the latter and pulls the carriage 11 back to the beginning of the line. Upon the return stroke of the handle 57, the barrel 109$^b$ is arranged to take up the slack in the strap, as usual in said Underwood-Hanson machine and as disclosed in said Hart application 466,836.

The mechanism so far described is disclosed in certain pending applications, including one filed by Frederick A. Hart, December 10, 1908, serially numbered 466,836 (now Patent No. 1,270,411, dated June 25, 1918). One of the advantages of the present improvements is that the machine is adapted to subtract, when required, without sacrificing the leading features of the mechanism so far described. Moreover, according to the present improvements, the machine can be constructed to subtract without undue or expensive alterations in the mechanism.

In effecting subtraction, the computing wheels are turned in the same direction as when adding. In subtraction, as in addition, the movements of the computing wheels are effected or controlled by the general operator above described.

In proceeding to subtract, a subtraction key or finger piece 110 is pressed. One of the functions of this key is to set all the "9" pins 41 on the rack bars 33. The handle 57 of the general operator may be then pulled forward, whereby all of the rack bars 33 are advanced and caused to turn their wheels each through nine-tenths of a revolution. Upon the return stroke of the general operator, the described tens-carrying mechanism will operate to complete the revolution of each computing wheel through 360 degrees, except that of lowest denomination; the latter being advanced automatically one notch by means that will presently be explained. Thus if said key 110 be operated and then the handle 57 be swung forwardly and backwardly, all of the number wheels 34 will be turned idly an entire revolution, even though no numeral key is operated, and regardless of the initial positions of the several wheels, so that the same reading will be given at the sight opening 111 as before.

If, after pressing the subtraction key, any one of the numeral keys is operated, as for instance the key marked "2," Fig. 1, the "9" pin on whichever rack bar 33 is in action, will be automatically restored to its normal idle position, and another of the pins 41 on said rack bar will be projected (by means presently to be described), namely, the pin which is the second one forward from the "9" pin just restored. Hence, when the handle 57 is operated, the cross bar 50 will advance the rack bar in question only seven points, while the remaining rack bars are advanced nine points; and upon the return stroke of said handle, each of said remaining number wheels will of course be advanced another step or unit movement. Therefore all of said number wheels will show the same reading as before, with the exception that one of them will show a number which is two less than the number that it previously showed. In effect, two has been subtracted from the amount previously shown on the selected number wheel.

From the foregoing, it will be understood that at the subtraction operation the numeral key marked "1" at Fig. 1, if depressed, must set a pin 41 which is next forward from the "9" pin on the selected rack bar 33; the key marked "2" must depress the pin which is second forward from the "9" pin on the selected rack bar; the key marked "3" must depress the third pin forward from the "9" pin; that marked "4" must depress the fourth pin forward; that marked "5" must depress the fifth pin forward; that marked "6" the sixth pin forward; that marked "7" the seventh pin forward; that marked "8" the eighth pin forward; but the key which is marked "9" must not depress any pin, since nine from nine leaves nothing, and hence the selected number wheel must remain stationary during the forward stroke of the handle 57, i. e., it must drop nine points behind such wheels as are to make an entire revolution. In each case it will be understood that the "9" pin which has been previously set by the operation of the subtraction key 110, must be restored to its normal idle position, so that the rack bar 33 whose pin is projected by the "1" key, will be advanced one less than nine, or will drop behind to the extent of one point; that whose pin was projected by the "2" key will be advanced two less than nine, (dropping back two points); that whose pin was projected by the "3" key will be advanced three less than 9, and so on; the rack bar coöperating with the "9" key not being advanced at all. From this it will be understood that at the forward stroke of the handle 57 the rack bars having pins set by means of the numeral keys will be advanced correspondingly, and their associated number wheels will be turned accordingly; while all the remaining rack bars 33 will be advanced full strokes, and their wheels turned nine points. Certain wheels may also be turned each an additional point during the return stroke of the handle 57 and the general operator connected thereto. The means whereby the subtraction key 110 shifts the connections between the numeral keys and the settable pins 41, so that the desired result can be obtained, will presently be described.

Assuming that all the wheels read "0" at the sight opening 111, and that the subtraction key 110 be pressed back, and that the numeral key bearing the figure "1" is depressed, and the handle 57 swung forwardly and then backwardly; the carriage 11 standing in such a position that the tappet 20 is connected through a jack 26 with the units rack bar 33, it will be understood that all of the "9" pins on the rack bars 33 will have been depressed by key 110, and that the "9" pin on the units rack bar 33 will have been restored again to normal idle position by the key "1", and also that the pin next forward thereof will have been simultaneously depressed. The forward stroke of the handle 57 will have caused the cross bar 50 to advance all of the rack bars nine points, except the units rack bar, which is advanced only eight points, so that the number now appearing at the sight opening is "999,999.98." Upon the return stroke of the handle the units wheel is advanced automatically an additional point, as will presently be explained, while the remaining wheels remain motionless, so that the number finally shown at the sight opening is "999,999.99." Since the units wheel has not been advanced an entire revolution from its "0" position, it has failed to operate the tens-carrying mechanism, and hence the wheels of higher denominations stand in the positions to which they were brought at the forward stroke of the handle 57, by reason of their "9" pins 41 having been all set by the subtraction key 110. It will thus be seen that the effect of moving said key 110 is to cause "1" to be subtracted from every number wheel during the ensuing forward stroke of the handle 57, regardless of where the number wheels may originally stand; and whether this loss of "1" is restored upon the return stroke of the operating handle 57, depends usually upon the positions of the tens-carrying members at the time. Where a rack bar 33 has been unaffected by any of the numeral keys, it turns its wheel nine points on the advance stroke of the handle 57, and the tens-carrying mechanism advances the same wheel one point upon the return of said handle 57, unless the operation of certain of the numeral keys has affected the pins on one or more of the other rack bars 33 in such a manner as to affect the tens-carrying mechanism so that it will fail to act in this particular instance on the return stroke of the handle 57.

Assuming that the number shown at the sight opening 111 is "000,088.88," and that it is desired to subtract a number which contains several zeros, as for instance 20.06, the carriage 11 is first moved to the thousands place, the subtraction key is pressed back, and the numeral key "2" is operated. Then the numeral key "0" is struck twice, and then the numeral key "6." Then the handle 57 is drawn forward, turning each of the first four wheels nine points. At the same time the thousands wheel is advanced two less than nine points (or seven points), the hundreds wheel is advanced nine points, the tens wheel is advanced the same, and the units wheel is advanced six less than nine points (or three points). In other words, the thousands wheel and the units wheel drop behind the remaining wheels, and the number appearing at the sight opening is "999,957.71." In advancing the thousands wheel seven points from "8" to "5," the associated tens-carrying pinion 75 was turned by tooth 74. The tooth 74 on the units wheel also turned its tens-carrying pinion. It will also be understood that in turning nine points from "8" to "7," each of the tens and hundreds wheels also advanced or set its associated pinion 75. Upon the return stroke of the handle, the units wheel is advanced automatically one point, as will presently be explained, the units segment 77 turns its pinion 75 and advances the tens wheel to "8." The next segment likewise advances its hundreds wheel to "8." The next advances the thousands wheel to "6"; and tens are likewise carried on all the higher wheels, so that the number at the sight opening reads "000,068.82." Thus it will be seen that at the forward stroke of the handle 57 some of the tens-carrying pinions 75 may be advanced by the special teeth 74, while others may not; and at the return stroke of said handle 57, all of such tens-carrying pinions 75 as have been so advanced will be turned still more by their segments 77, in each instance advancing the wheel of next higher denomination.

The subtraction operation thus involves revolving idly through an entire revolution such wheels as are not in use, and it involves the use of the tens-carrying mechanism in such a way that tens are in effect borrowed from wheels of higher denomination to such an extent as may be requisite, the tens being borrowed during the advance stroke of the handle 57, and being restored by the tens-carrying mechanism on the return stroke of the general operator only in such cases as are requisite.

As before stated, the subtraction key 110 shifts certain connections whereby the numeral keys 2 set the pins 41, so that the key "1" will set the pin next forward of the nine pin on any selected rack bar 33, the key "2" will set the pin two points forward of the nine pin, and so on, to cause the selected number wheels to drop behind, each to a corresponding extent, at the general rotation of the computing wheels during the cycle of subtracting operations. The same nest of cross-links 45 is used in the subtracting operation, as in the adding operation heretofore explained; and each cross-link is associated with the same cross-row of pins 41 as in performing addition; but at the subtracting operation the first key "1", instead of operating the foremost cross-link 45, as in the adding operation, is connected to that link which is just forward of the rearmost cross link. This connection is effected by means of a slotted arm 112, Figs. 7, 20, which engages a subtraction wrist 113 provided upon the link in question; the addition wrist 46 on the opposite end of the same link being disengaged and out of use at the subtraction operation. The shifting of the arm 112 into engagement with the wrist 113 is effected by the pressing back of the key 110, which it will be seen, is attached to the front end of a horizontal push rod 114, Figs. 5, 7, 8, 19, 22, pivotally supported at its rear end upon a rock-arm 115, and having between its ends a wrist 116, Figs. 7, 22, which engages the lower end of a lever 117 and presses it back; the upper end of said lever swinging forwardly to press in the same direction a universal shifter bar 118, which extends across the machine and is pivoted at its opposite ends in fixed ears 119; the lower edge of said shifter bar engaging peripheral grooves or slots 120 in all of the forwardly extending rock-shafts 48 which carry at their forward ends the key-operated arms 49. The forked arm 112, which is normally out of engagement with the subtraction-wrist 113, is hence shifted forward into engagement therewith; but at the same time the arm 47 which is fixed upon the same rock-shaft 48, is shifted out of engagement with the addition wrist 46 on the foremost cross-link 45.

A similar operation takes place with respect to each of the other cross-links; arm 121, (Figs. 7, 20), on the second rock-shaft 48 (operated by key "2") slipping into engagement with the subtraction-wrist 122 on the third cross link from the rear, while the forward arm 47 on the same rock shaft slips out of engagement with the addition-wrist 46 on the second cross-link from the front. On the third rock-shaft (operated by the key "3") arm 123 slips forward into engagement with the subtraction-wrist 124 on the fourth cross-link from the rear, while the other arm 47 on said shaft slips out of engagement with the wrist 46 on the third cross-link from the front. Numeral key "4" controls a shaft 48 on which is fixed a rock arm 125, which at the forward shifting of said shaft slips into engagement with a subtraction-wrist 126 on the fifth cross-link from the rear; while the forward arm 47 on the same rock shaft slips out of engagement with the wrist 46 on the fourth cross-link from the front. Upon the next rock shaft 48, which is operated by the numeral key "5", is but a single rock arm 47, and this is shifted out of engagement with the addition-wrist 46 on the fifth cross-link from the front, and into engagement with a subtraction-wrist 127 on the sixth cross-link from the rear. The key "6" operates a rock shaft which likewise has a subtraction arm 128, which is slipped into engagement with wrist 129 on the seventh cross-link from the rear, while the rock arm 47 on this shaft is slipped out of engagement with the addition-wrist 46 on the sixth cross-link from the front. The rock shafts operated by keys "7" and "8" are correspondingly equipped and shifted, the rock-shaft for the key "8" having an arm 130 which is shifted into engagement with a wrist 131 on the ninth cross-link from the rear; this being the last link of the nest. The key "9" rocks the extreme right-hand shaft 48 of the series; and at the operation of the subtraction key 110, the arm 47 on said shaft is shifted out of engagement with the wrist 46 on the rearmost cross-link 45 of the nest; but no other arm is provided on this shaft, since at the subtraction operation the shaft turns idly, the number wheel 34 which is at the time associated with said rock shaft not being advanced by its rack at the forward stroke of the general operating handle 57, and said number wheel hence dropping nine points behind the normal advancing movement of the number wheels at such stroke of said handle.

The levers 49 on the forward ends of said rock shafts are thick enough to compensate for their forward shifting movements, so that the key stems 43 may always engage the same; and it will be understood in subtracting that when key "1" is depressed, the first cross-link 45 forward of the "9" cross-link, (which is the rearmost of the nest) is thrust to the left, and the corresponding pin 41 is depressed upon such rack-bar 33 as happens to be elevated; that when key "2" is depressed, the second cross-link 45 from the rearmost is operated, and a pin 41 is depressed which is second from the rearmost pin on any elevated rack bar 33; and so on throughout the series; no pin 41 being depressed, however, when the "9" key is operated, for reasons just given. Each of the keys "1" to "8" therefore sets a pin whose value is one less than the complement of the key. The diagonal row of subtraction arms intersects the row of addition arms. The "5" arm may be regarded as a double arm, one arm or portion to engage the "5" link and the other to engage the "4" link.

When the subtraction key 110 is pressed back (Fig. 7) to swing the universal shifter bar 118 forward, to shift endwise all of the rock shafts 48, a latch 132 is snapped by a spring 132$^a$ (Fig. 21) to a position behind said universal shifter bar, to detain the same in its effective position, so that the user of the machine may release the subtraction key 110, and have both hands free to manipulate the type-operating keys.

It has been above stated that operation of the subtraction key 110 sets "9" pins 41 on all of the wheel-operating racks 33. To do this, all the rack bars are simultaneously lifted; said arm 115, to which the rod or stem 114 is pivoted, being fixed upon a rock shaft 133, which has a universal bar or bail 134 extending across under the rear ends of all of the rack bars 33, so that when said stem is thrust rearwardly, the shaft is rocked and all of said rack bars are lifted. The "9" pins on said rack bars are all simultaneously depressed or projected below the racks by a universal bail 134$^a$ fixed on the same rock-shaft 134$^b$ which carries the lever 117 (Figs. 5, 7, 15, 19, 22); said universal bail engaging and depressing the forward ends of levers 139 (which are connected to the "9" pins) sufficiently to force the "9" pins to project below the rack bars, where they may be all subsequently engaged by the cross bar 50 of the general operator, so that at the forward movement of the latter, all of their number wheels may be rotated nine points.

As above explained, whenever all the "9" pins have been set by the subtraction key 110, and a numeral key has been thereafter operated to set a pin upon any selected wheel-operating rack bar 33, the originally set "9" pin on the same rack bar is automatically restored to normal idle position. This is done by means of a universal linkage, operable by all of the numeral keys. It comprises a transverse endwise-moving link 135, Figs. 7, 20, 22, 23, 24, bell cranks 136, 137, and a transverse downwtradly-moving link or bar 138 in position to depress (Fig. 24) any of a set of levers 139 which are mounted upon the rack bars 33 and connected to the "9" pins to move the same. Each lever is pivoted between its ends at 140 (Fig. 26) to its rack bar 33, and at its forward end fits in a groove 141 formed in the "9" pin 41; and when any rack bar 33 is lifted by the carriage tappet 20 (through a jack 26, etc.) any any numeral key 2 is depressed, the universal link 138 will press down the lever 139 from the dotted line position at Fig. 24, thus restoring the "9" pin 41 on said elevated rack to its normal condition. All of the key-operated rock shafts 48 are provided on their rear ends with upstanding arms 142, to engage corresponding wrists 143 on said cross link 135, to effect the restoration to normal idle condition of the "9" pin previously set by the subtraction key 110; a spring 144 (Fig. 23) serving to return this universal pin-restoring linkage to normal position upon the release of the depressed numeral key. Normally the arms 142 stand back of the wrists 143 and are hence ineffective at the adding operation; but when the shafts 48 are shifted forwardly by the subtraction key 110, said arms are shifted therewith into positions for engaging the wrists 143.

The subtraction key 110 returns to normal position as soon as released, together with the rock shaft 133, and the bail 134; the weight of the bail and of the rear end of the rack bars being sufficient to return the parts. The latch 132, which temporarily holds the system of rock shafts 48 in their subtracting positions, is automatically released during the return stroke of the general operating handle 57, the release of said latch being effected by a hooked finger 145, Figs. 7, 19, 22, fixed upon a transverse horizontal bar 146, to catch an arm 147 on said latch, to turn the same around its pivot 148 and release the universal shifter bar 118. Said bar 146, during the return stroke of the general operating handle 57, is rocked temporarily to a position over shoulders 149 on the rack bars 33, to lock them against lifting; said bar 146 forming part of a rocking frame, Figs. 28, 30, the other members whereof comprise arms 150 and a rock shaft 151; the latter also having an arm 152 connected by a forwardly extending link 153 to follower 154 running upon a cam 155 fixed upon shaft 78 which bears the tens-carrying segments 77, and is provided with a yielding detent 156 fitting in a notch in a disk 157$^c$. A spring 156$^a$ holds the bar 146 in its normal forward idle position. When said latch releases the universal shifter bar 118, one or more springs 157, coiled around shafts 48, swing said bar 118 back to normal position, together with the rock shafts 48, whereby all of the arms 47 are reconnected with the addition wrists 46, the arms 112, etc., are released, and arms 142 are disconnected from the wrists 143 upon the universal "9" pin restoring link 135. The error key 100 may also release the latch 117, said key having a stem 157$^a$ to depress an arm 157$^b$ (Fig. 30) on rock shaft 154$^a$ carrying arm 154, Fig. 28.

It will be seen that the key 110 is operated every time a number is to be subtracted, so as to project the "9" pins as well as perform other operations; and that the subtraction devices are automatically silenced at the return stroke of the general operator handle 57. In other words, the machine is automatically re-set for addition after each number is subtracted.

It will be noted that, after both setting up and writing the number on the work-sheet by means of the typewriting numeral keys 2, the operative manipulates the handle 57 both to complete the computing operation and prepare for the next writing and computing operation; and that this general preparatory operation effected by said handle includes the returning of the typewriter carriage 11 to the beginning of the line, as well as the line-spacing of the work-sheet carried on the platen 6, (both being effected by said handle 57), and also includes the movement of the general operator carriage 50, 51, 51$^a$, 52, which both carries the number into the wheels and also (if the machine has been set to subtraction) restores the machine to condition for addition.

As before explained, the operation of the subtraction key 110 is intended to set the machine to give a complete idle revolution to all of the computing wheels which have rack bars 33; and in order to effect this, the tens-carrying mechanism is depended upon, the wheels being given an advance rotation of nine points at the forward stroke of the general operator handle 57, and, if required, an additional advance of one point by the tens-carrying mechanism at the return stroke of the general operator. The tens-carrying mechanism of course cannot operate the units wheel, but there is provided a special device to effect the necessary advance of the units wheel a single point at the return stroke of the general operator, preferably at the initial portion of said return stroke, before the operation of the tens-carrying mechanism. A slide bar 158, Figs. 4, 7 and 19, somewhat resembling the wheel-operating rack bars 33, is mounted at the right of the nest of rack bars 33, and is provided with a single settable pin 159, preferably in line with the "1" pins 41 on said rack bars. The subtraction key 110 lifts this special bar 158, as well as the bars 33, and said pin 159 encounters a fixed abutment 160 during the upward movement of bar 158, and is forced to project from the bottom of said bar, where it is engaged by the cross bar 50 of the general operator at the last part of the forward stroke of the latter, whereby the bar 158 is thrust forward, to engage and operate an arm 161 of a bell-crank, to the other arm 162 of which is pivoted a pawl 163, the latter caused by a spring 164 to engage a ten-toothed wheel 73 fixed to the units wheel 34. The effect of the forward movement of the bar 158 is to swing down the arm 162 of the bell-crank to the Fig. 4 position, pulling down pawl 163 to position to engage the succeeding tooth of the wheel 73. A spring 164<sup>a</sup> returns the bell-crank 162, pawl 163 and bar 158 to normal positions, the pawl advancing the toothed wheel 73 and units wheel to the extent of one-tenth of a revolution, so that the next higher number thereon is shown at the sight opening 111. The universal pin-restoring plate 59, Fig. 21, has an ear 165 to restore the pin 159 on the bar 158, Figs. 4, 7 and 9, that operates the units wheel pawl 163.

Figure 31:
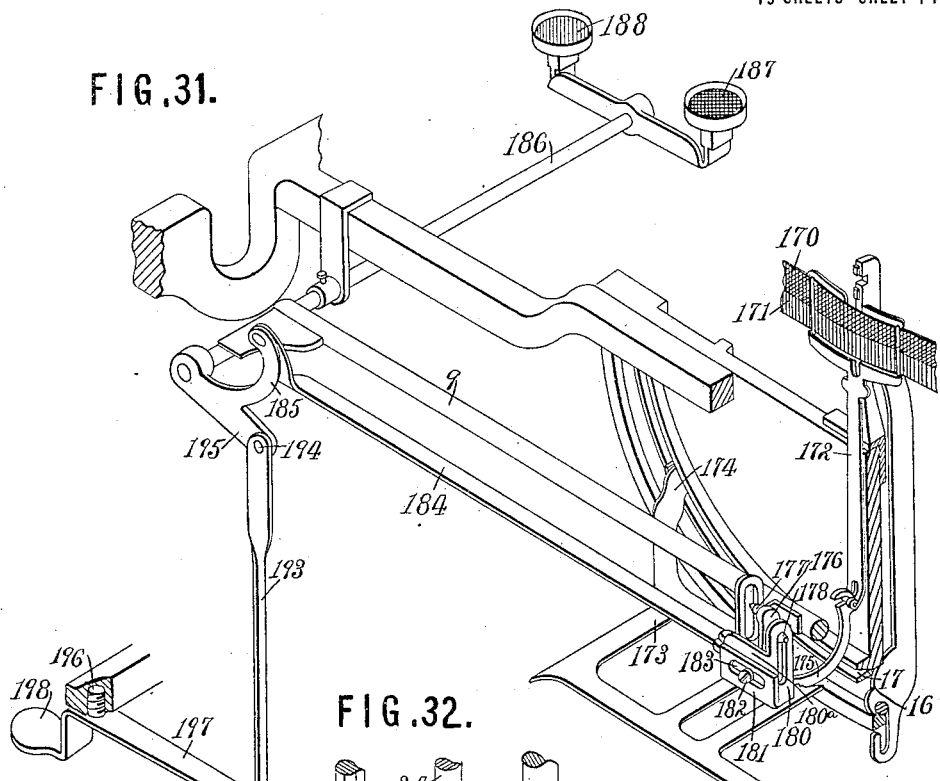
Fig. 31 is a perspective rear view of the Underwood bichrome ribbon mechanism and its connections to the subtracting mechanism of the machine.
Figure 32:
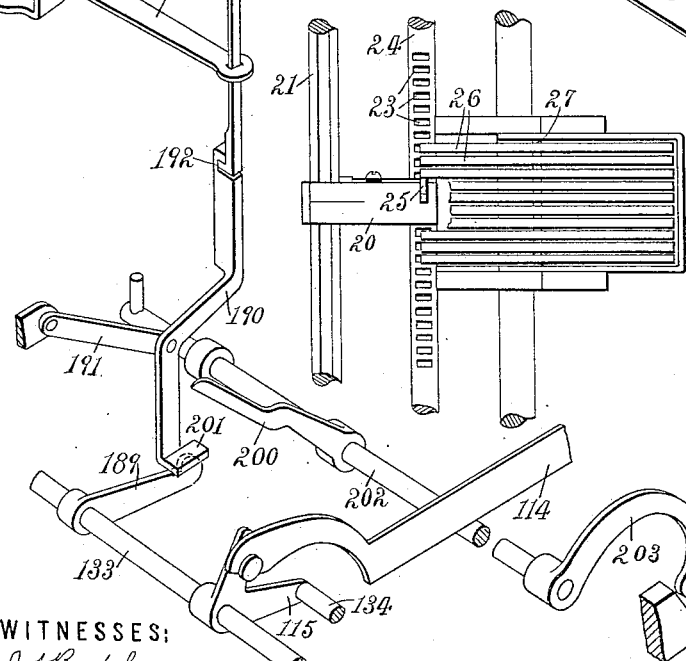
Fig. 32 is a plan of the jacks and certain other portions of the wheel-selecting mechanism connected to the typewriter carriage.
Figure 33:
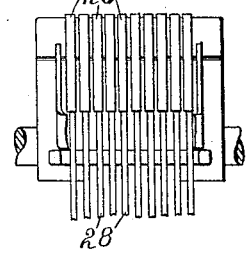
Fig. 33 is a rear elevation of the jacks and the links which connect them to other portions of the wheel-selecting mechanism at the bottom of the machine.

In the Underwood typewriting machine, the types strike through a ribbon, which is shown at Fig. 31 as comprising an upper stripe 170 of one color and a lower stripe 171 of another color, said ribbon being threaded through a vibrator 172 which is connected to a frame 173, the latter fixed by arms 174 to the universal bar 17, which reciprocates at every type stroke. As shown in Patent No. 926,050 to F. A. Cook, the vibrator 172 is connected to a lever 175, the latter comprising an arm 176 (Fig. 25) provided with upper and lower opposite wrists 177, 178, to engage slotted ears 179, 180 in an actuating head 180<sup>a</sup>, which is adjustably connected to a bracket 181 fixed upon said universal bar frame 173; said actuating head having a guide pin 182 to slide in a slot 183 in said bracket 181. The actuating head 180<sup>a</sup> is connected by a link 184 (which vibrates idly at the type strokes) to an arm 185 fixed upon a forwardly extending rock shaft 186, having at its forward end keys 187, 188, whereby adjustment of the actuating head 180<sup>a</sup> is effected, to bring it into engagement with either wrist 177 or 178, to vary the throw of the lever 175 at the type strokes, so as to bring either stripe 170 or 171 into action. The stripe 170 is usually black, and is used for addition, etc., while stripe 171 is red, and in the present case is used when writing a number that is to be subtracted; said stripe 171 being called into action by the subtraction key 110. As already explained, said subtraction key is on a rod 114, the rear end of which is pivoted to arm 115 on rock shaft 133. This rock shaft also carries an arm 189, Figs. 2, 28 and 31, to engage and lift a shifter bar 190, guided near its lower end by a link 191, and preferably comprising two portions detachably connected by a hook joint at 192; the upper section 193 of said bar or rod being pivoted at 194 to an ear 195 formed on the ribbon-shifting arm 185. When the subtraction key and rod 114 are pressed back, the shaft 133 is rocked and the arm 189 rises, thrusting up the rod 190, 193 and the arm 185, and drawing to the left at Fig. 31 the link 184, as well as the actuating head 180<sup>a</sup>, and this brings the slot in the ear 180 into engagement with wrist 178, and at the same time the wrist 177 is disengaged from the slotted ear 179. The wrist 178 being nearer the fulcrum 195<sup>a</sup> of the lever 175 than the wrist 177, Fig. 25, the lever is given a greater stroke, (the stroke of universal bar 173 being uniform) and hence the lower stripe 171 of the ribbon is thrown upward to cover the printing point at each key stroke, to cause the types to print red on the work sheet, thus indicating subtraction of the written number.

Figure 2:
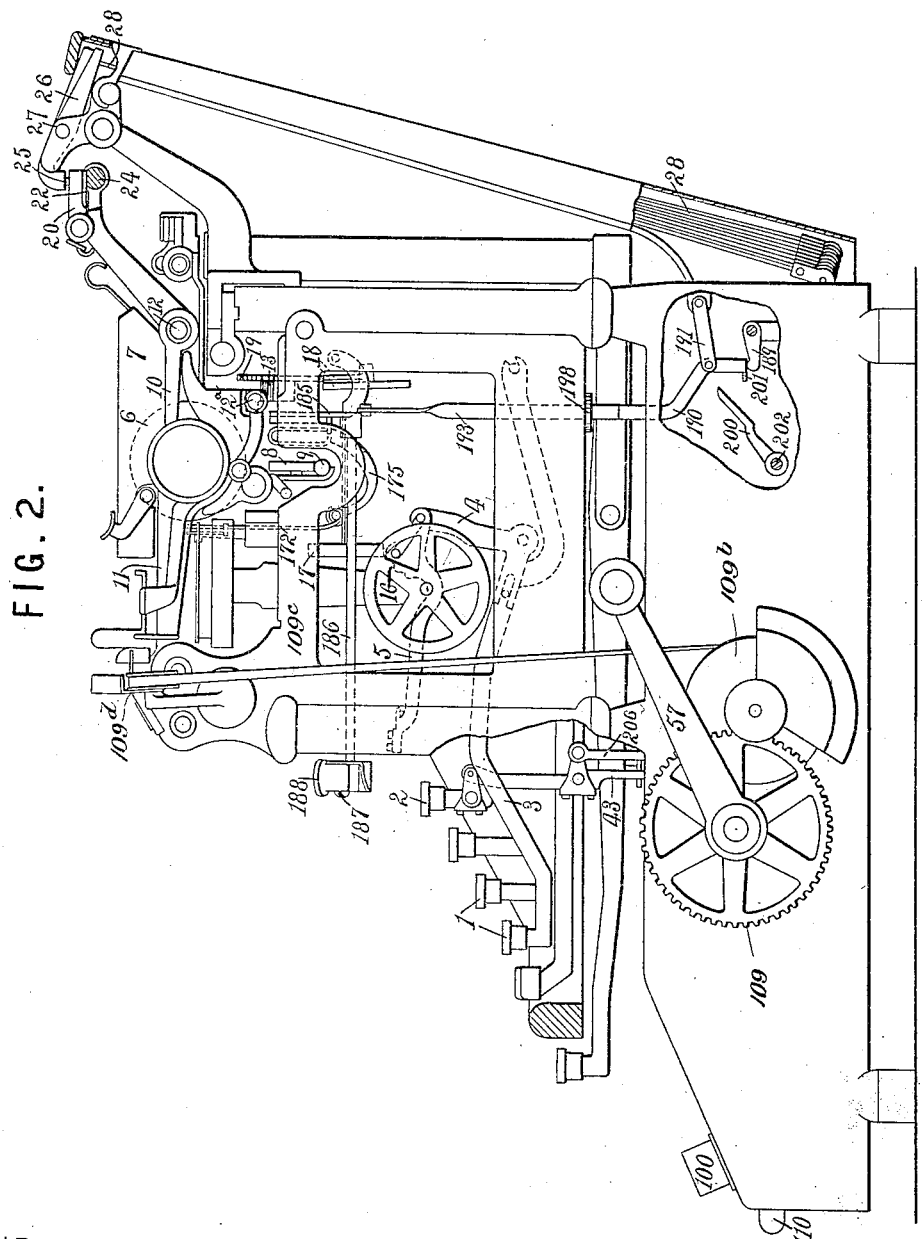
Fig. 2 is a side elevation of the same.
Figure 3:
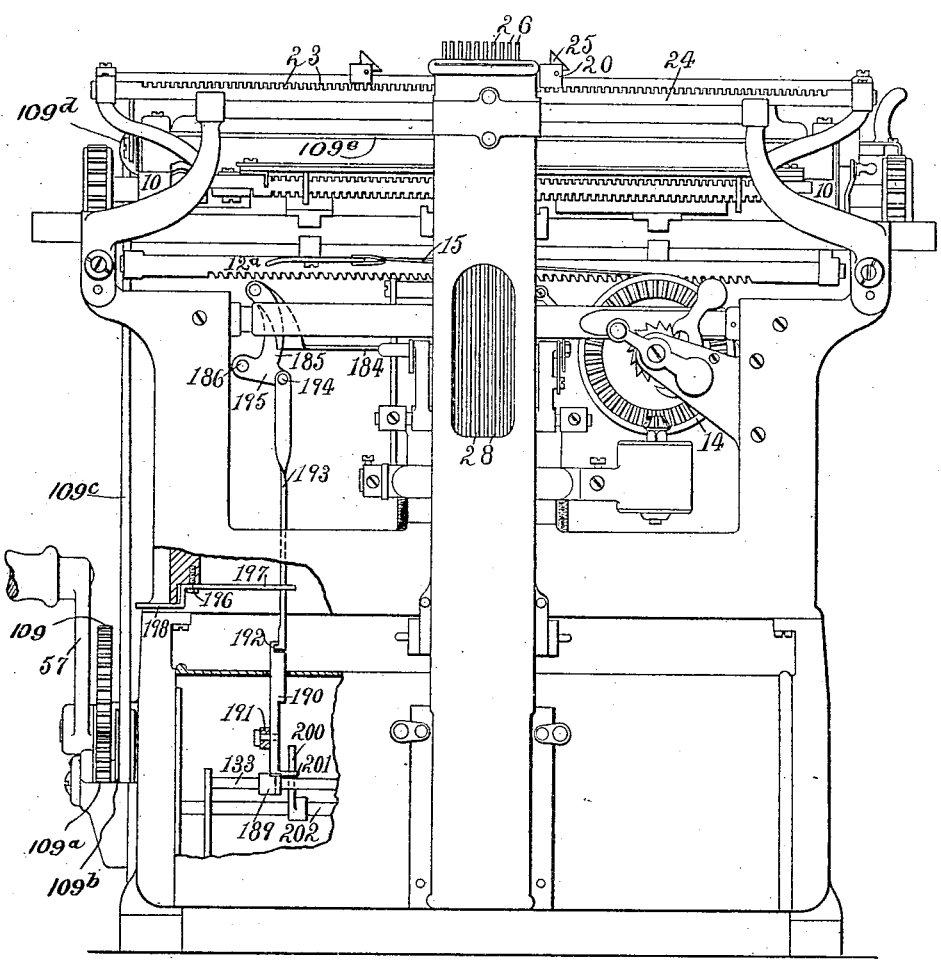
Fig. 3 is a rear elevation of the machine.
Figure 4:
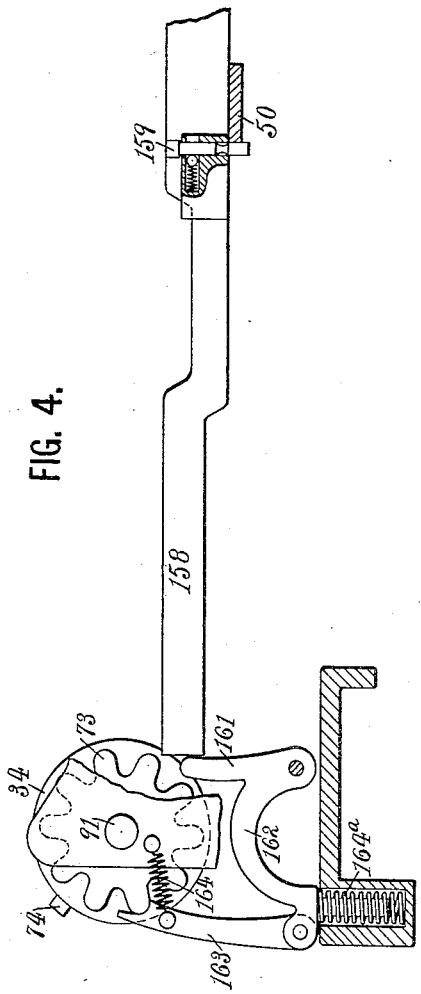
Fig. 4 is a side elevation of devices employed for giving the units wheel an extra advance of one step at the subtraction operation; the parts being shown at the end of the initial stroke of the general operator.

Pivoted to the right hand side of the typewriter framework at 196 is a lever 197 having a finger-piece 198, Figs. 2, 31, whereby the section 193 may be swung to disengage its hook at 192 from the section 190, to disconnect the ribbon mechanism from the adding mechanism, whenever it is desired to detach the typewriting machine from the adding mechanism as well as for other purposes. As explained in said applications and patents the typewriter is detachably connected to the adding machine. The usual ribbon shift keys 187, 188 may be used at any time to change the color of the ribbon, without affecting the adding or subtracting devices.

After the number has been written in red, the handle 57 is pulled forward, and an arm 200, Figs. 2, 7, 19, 28 and 31, swings down to engage a shoulder 201 on the lower end of the rod 190, to pull the same down and restore the ribbon-shifting mechanism to its original position. Said arm 200 is fixed upon a rock shaft 202 journaled in the opposite sides of the machine, and having an arm 203 which rests in a notch 204 in slide 51 when the general operating frame is in normal position; but upon the forward movement of said frame, the inclined rear face of said notch lifts the arm 203 and turns the shaft 202 and depresses the arm 200 thereon, to restore bar 190 to original position. This shaft 202 has heretofore been provided with an arm 205 which swings down to lock the rack-lifting linkages 32, during the principal portions of the advancing and retreating strokes of the general operator.

After the operator has pressed in the finger-piece 110, to set the machine to subtraction, and after he has also operated the numeral keys both to write the number in red, and also to set up the indexing mechanism, steps must be taken both to complete the computing operation and do whatever else is necessary preparatory to beginning the next computation; that is, the black ribbon must be restored to use, the mechanism must be set back to addition, and the carriage must be set to position for beginning the next computation. All of this is done concomitantly by the handle 57. Inasmuch as this handle is a reciprocating handle, some of the operations are performed during one stroke and some during the other stroke; but all are performed during a single cycle. The movement of the typewriter carriage 11 controlled by said handle is effected during the first part of the cycle of operations of said handle 57, and the resetting of the machine to addition is done during the last part of the cycle of said handle; but said movement of the typewriter carriage and said return to addition are concomitant, being both performed in the same cycle. That is to say, the operation of subtraction cannot be completed without all of these operations being performed, inasmuch as the return stroke of the handle 57 is necessary in order to take care of the carry-over operation. The movement of the typewriter carriage 11 which is effected by said handle, occurs at the same time that the computing carriage 50, 51, 51ᵃ, 52 is advancing to carry the numbers into the wheels; and since upon the advance stroke of said computing carriage, the typewriter carriage 11 is being moved by said handle 57, it will be seen that the shifting of the ribbon mechanism from red to black occurs simultaneously with the movement of the typewriter carriage 11, such shift being effected by the device 57 which is connected to said typewriter carriage 11 to move it. Thus the carrying of the numbers into the wheels, the operation of the carry-over device, the restoration of the machine to the state of addition, the restoration of the black ribbon, and the movement of the carriage, are all preparatory to the next computation, and all effected concomitantly at a single cycle of operations of said handle 57.

Figure 6:
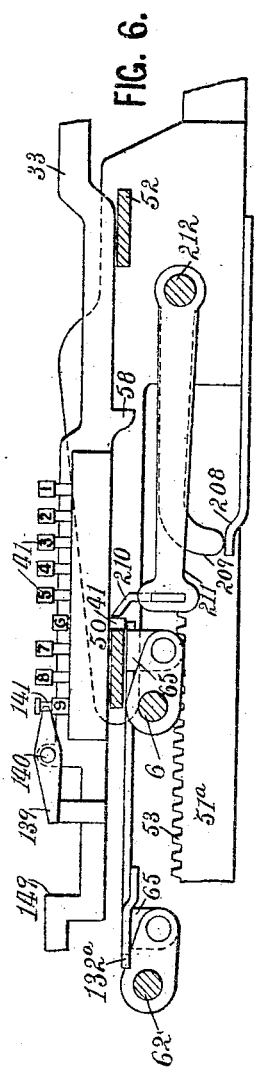
Fig. 6 is a view taken at the opposite side of the machine from Fig. 5, and showing a pin on one of the wheel-controlling rack bars as having been set, and as now being engaged by the general operator to drive its wheel forward. This shows the general operator at the completion of its initial or forward stroke toward the right.
Figure 7:
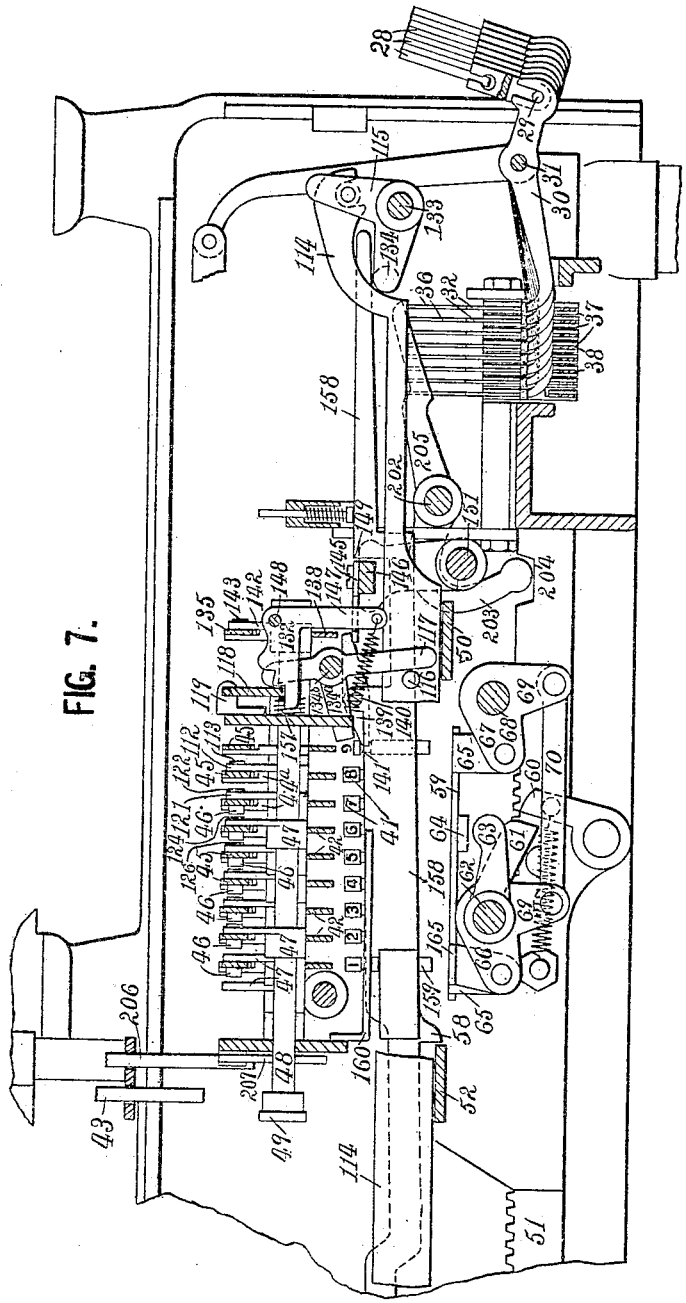
Fig. 7 is a sectional elevation on a larger scale of the devices seen in the rear portion of Fig. 5; the "9" pins having been set by the subtraction key, as well as the pin whereby the units wheel is given an extra advance of one step.

The general operator is provided with a cam 208, Fig. 6, which during the final portion of the forward stroke of the operator lifts an arm 209 to elevate an intercepting bar 210 into the paths of the advancing pins 41, to prevent the racks and wheels from overthrowing; said bar 210 being carried upon arms 211, which are fixed upon a rock shaft 212, that carries said arm 209.

Each numeral key may have a special stem 206 to coöperate with pivoted locks 207, Figs. 20 and 21, to lock the remaining keys against actuation, and to prevent simultaneous operation of two keys, as set forth in said Hart application.

It will be seen that certain features of the invention may be carried out in machines in which pins are set by the keys for determining the extent of rotation of the number wheels, whether or not the pins are also used for the purpose of advancing the wheels.

Thus a typewriter key bearing only a single numeral may be employed either for adding that numeral (in performing addition) or for adding its complement (in performing subtraction). This is of advantage as tending to avoid confusion and mistakes by the operator, and it has the further advantage that the same key may always operate the same type, whether the number printed thereby is to be added or subtracted; and I claim broadly this feature as a part of my invention.

Variations may be resorted to within the scope of the invention, and portions of the improvements may be used without others.

Having thus described my invention, I claim:

1. The combination with a system of computing wheels or devices, of a subtraction mechanism including means to advance all of said computing wheels ten steps or numbers at each subtraction operation, and also including means to cause any selected wheels to drop behind the others to any desired extent at any subtraction operation.

2. The combination with keys, of a system of computing wheels or devices, a general operator, tens-carrying mechanism, means for enabling the keys to coöperate with said general operator to advance any selected number wheels each to an extent equal to one less than the complement of the key operated, means for coöperating with said general operator to advance nine steps all of the remaining wheels, and means for advancing the units wheel an extra step at each subtraction operation.

3. In a computing machine, the combination with computing mechanism having denominational orders, numeral keys, indexing devices controlled by said keys, and actuating mechanism for moving said computing mechanism in one direction under the control of said indexing devices; of subtraction setting mechanism to control said computing mechanism and said indexing devices so as to enable the subtraction of any number, up to the denominational capacity of the computing mechanism solely by the operation of the keys corresponding to the number to be subtracted and the operation of said operating mechanism.

4. In a computing machine, the combination with computing mechanism having denominational orders, numeral keys, actuating mechanism and indexing devices settable by said keys to control the actuating mechanism to perform addition; of means settable to control said actuating mechanism and to enable said keys to differently set said indexing devices so as to enable the subtraction of any number having a digital value up to the denominational capacity of the computing mechanism solely by the operation of the keys corresponding to the number of the keys to be subtracted and the operation of said actuating mechanism.

5. The combination of a system of number wheels or devices, a series of settable pins for each wheel, a subtraction key, numeral keys, means controlled by said numeral keys for setting pins for the wheels, means controlled by the subtraction key to set "9" pins for all wheels whose pins are unaffected by the numeral keys, means to coöperate with the pins for operating the wheels, means for advancing the units wheel an extra step, and a tens-carrying device operative after said units wheel is advanced the extra step.

6. The combination of a system of number wheels or devices, a series of settable pins for each wheel, means for setting the "9" pins for all of the wheels concomitantly, means for restoring the "9" pin of any number wheel to normal position and concomitantly selecting and setting another pin for said wheel, means to coöperate with the pins to operate the number wheels, means to advance the units wheel an extra step, and tens-carrying or transfer mechanism.

7. The combination of a system of number wheels or devices, a series of settable pins for each wheel, means for setting the "9" pins for all of the wheels concomitantly, means for restoring the "9" pin of any number wheel to normal position and concomitantly selecting and setting another pin for said wheel, a general operator having means to coöperate with the pins to operate the number wheels, means connected to said general operator to advance the units wheel an extra step, and tens-carrying or transfer mechanism connected to said general operator to be operated after said units wheel has been advanced the extra step.

8. The combination of a system of number wheels or devices, a series of keys numbered from "1" to "9", a series of settable pins for each wheel, means for setting the "9" pins for all of the wheels concomitantly, means controlled by any of said keys to restore the "9" pin of any number wheel, means connected to the first eight of said keys for concomitantly setting a corresponding pin for the same wheel, the key marked "1" connected to set the pin which is next to the "9" pin, the key marked "2" connected to set the second pin from the "9" pin, and so on throughout the series, means to coöperate with the pins to advance the number wheels, means to advance the units wheel an extra step, and tens-carrying mechanism.

9. In a computing machine, the combination with computing wheels, numeral keys, actuating mechanism individual to each wheel, and indexing devices settable by said keys to control said actuating mechanism to perform addition; of means settable to enable said keys to set the indexing devices corresponding to one less than the digital value of the key operated, said settable means also acting to control said actuating mechanism, so that subtraction is performed on the operation of the keys corresponding to the number to be subtracted and the operation of said actuating mechanism.

10. In a computing machine, the combination with computing wheels, numeral keys, actuating mechanism, and indexing devices operable by said keys to control said actuating mechanism; of means settable to enable the keys to control said indexing devices, so that said actuating mechanism may advance any selected number wheels each to an extent equal to one less than the complement of the key operated, said settable means also controlling said actuating mechanism to advance nine steps all of the remaining wheels, means for advancing the units wheel an extra step, and means for carrying throughout the train of computing wheels.

11. The combination of a system of computing wheels or devices, a set of numeral keys numbered from "1" to "9", a set of racks or wheel-operating members, each having nine pins, all the pins taken together forming a cluster or group having similar pins in transverse rows, means independent of said keys for setting all the "9" pins concomitantly, a link or bar for setting any pin in the row next to the "9" pins, said link or bar connected to the numeral key numbered "1", links or bars for setting pins of the second, third, fourth, fifth, sixth, seventh and eighth rows from said "9" pins and connected respectively to the keys numbered "2", "3", "4", "5", "6", "7" and "8", the numeral key numbered "9" being incapable of setting any pin, means for enabling any of said keys to restore any previously set "9" pin on any wheel-operating member, means for enabling any of the first eight of said keys to concomitantly set another pin on the same member, means to advance the wheel-operating members accordingly, tens-carrying mechanism, and means for automatically advancing the units wheel an extra step.

12. The combination of a system of computing wheels or devices, a series of nine settable pins for each wheel, a set of numeral keys, a special subtraction key, means controlled by said subtraction key to set all of the "9" pins at each subtraction operation, means controlled by the numeral keys for restoring to idle position the associated "9"

pin, means controlled by the first eight numeral keys to concomitantly set certain pins, means to engage the set pins to advance said wheels, tens carrying devices, and means to give the units wheel an extra advance step.

13. The combination of a system of computing wheels or devices, individual racks or members for advancing said wheels, each rack provided with nine settable pins, means to set all of the "9" pins on said racks at a single operation, means for displacing any selected rack, a set of numeral keys numbered from "1" to "9", a member operable by any of said numeral keys for restoring the "9" pin on any displaced rack, means controlled by said numeral keys, except the "9" key for concomitantly setting any selected one of the remaining pins on the displaced rack, the keys numbered from "1" to "8" controlling respectively the pins from "8" to "1", means to engage the set pins to advance said racks and wheels, means to return said racks to initial positions, tens-carrying devices, and means to give the units wheel an extra advance of one step.

14. The combination of a system of computing wheels or devices, individual racks or members for advancing said wheels, each rack provided with nine settable pins, means to set all of the "9" pins on said racks at a single operation, means for displacing any selected rack, means for restoring the "9" pin on any displaced rack and concomitantly setting any of the remaining pins on said rack, means to engage the set pins to advance said racks and wheels, means to return said racks to initial positions, tens carrying devices, and means to give the units wheel an extra advance of one step.

15. The combination of a system of computing wheels or devices, individual racks or members for advancing said wheels, each rack provided with nine settable pins, means to set all of the "9" pins on said racks at a single operation, means for displacing any selected rack, means for restoring the "9" pin on any displaced rack and concomitantly setting any of the remaining pins on said rack, a reciprocatory general operator having means to engage the set pins to advance said racks and wheels, means to return said racks to initial positions, tens carrying devices, and means connected to said operator to give the units wheel an extra advance of one step.

16. The combination of a system of computing wheels or devices, a series of numeral keys, a set of wheel-operating members, each having nine pins, means independent of said keys for setting all the "9" pins concomitantly, links or bars controlled by said keys for setting any selected pins except the "9" pins, a link or bar common to said keys for restoring to idle position the "9" pin on any wheel-operating member concomitantly with the setting of another pin on such wheel-operating member, means to coöperate with the pins to advance and return the wheel-operating members, tens-carrying mechanism, and means for advancing the units wheel an extra step.

17. The combination of a series of numeral keys, a system of computing wheels or devices, a set of racks or wheel-operating members, each having nine pins, means independent of said keys for setting all of the "9" pins concomitantly, a series of rock shafts controlled by said keys, links or bars connected to the rock shafts for setting any selected pins except the "9" pins, a universal link or bar operable by any of said rock shafts, means controlled by said universal bar for restoring to idle position the "9" pin on any wheel-operating member concomitantly with the setting of another pin on such wheel-operating member, means to coöperate with the pins to advance and return the wheel-operating members, tens-carrying mechanism, and means for advancing the units wheel an extra step.

18. The combination of a series of numeral keys, a system of computing wheels or devices, a set of racks or wheel-operating members, each having nine pins, means independent of said keys for setting all of the "9" pins concomitantly, a series of rock shafts controlled by said keys, links or bars connected to the rock shafts for setting any selected pins except the "9" pins, a universal link or bar operable by any of said rock shafts, means controlled by said universal bar for restoring to idle position the "9" pin on any wheel-operating member concomitantly with the setting of another pin on such wheel-operating member, a general operator having means to coöperate with the pins to advance and return the wheel-operating members, means connected to said general operator for advancing the units wheel an extra step, and tens-carrying mechanism connected to said general operator to be operated after said units wheel has been advanced the extra step.

19. The combination of a series of numeral keys, a system of computing wheels or devices, a set of wheel-operating members, each having nine pins, means independent of said keys for setting all of the "9" pins concomitantly, a series of rock shafts operated by said keys, links or bars connected to said rock shafts for setting any selected pins except the "9" pins, a universal bar having projections, means on said rock shafts for engaging said projections to operate said universal bar, means connected to said universal bar for restoring to idle position the "9" pin on any wheel-operating member, means to coöperate with the pins to advance and return the wheel-operating members, tens-carrying mechanism, and means for advancing the units wheel an extra step.

20. The combination of a system of computing wheels or devices, individual racks or members for advancing said wheels, each rack provided with nine settable pins, a device on each rack connected to each "9" pin for restoring the same to normal position, means to set all of the "9" pins on said racks at a single operation, means for operating the "9"-pin restoring-device on any rack and concomitantly setting any of the remaining pins on such rack, means to engage the set pins to advance said racks and wheels, means to return said racks to initial positions, tens-carrying devices, and means to give the units wheel an extra advance of one step.

21. The combination of a series of numeral keys, a system of computing wheels or devices, a set of racks or wheel-operating members each having nine pins, means independent of said keys for setting all of the "9" pins concomitantly, a series of rock-shafts controlled by said keys, links or bars connected to the rock-shafts for setting any selected pins except the "9" pins, a universal link or bar operable by any of said rock shafts, levers or members upon said racks, any of said levers engageable by said universal bar to restore to idle position the "9" pin on any rack, means to coöperate with the pins to advance and return the wheel-operating members, tens-carrying mechanism, and means for advancing the units wheel an extra step.

22. The combination of a series of numeral keys, a system of computing wheels or devices, a set of racks or wheel-operating members, each having nine pins, means for setting all of the "9" pins concomitantly, key-controlled means for restoring to idle position the "9" pin on any selected rack and concomitantly setting one of the other pins on said rack, a general operator to engage said pins and advance the racks and wheels, a ratchet for the units wheel in said system, a pawl for said ratchet, a pawl-operating member having a part to be engaged by said general operator, a lever operable by said pawl-operating member, said pawl connected to said lever to be retracted at the initial stroke of the lever, a spring to advance said pawl and units wheel at the return stroke of the general operator, and a tens-carrying mechanism operable upon the return stroke of said general operator, and subsequent to the advance of said units wheel.

23. The combination of a system of computing wheels or devices, racks or members for advancing said computing wheels, said racks provided with settable pins, a key having means to set all the "9" pins, numeral keys numbered from "1" to "9" and having means to return to idle position the "9" pin on any selected rack, and concomitantly set any other pin on said rack, the keys numbered from "1" to "8" controlling respectively the pins from "8" to "1," a general operator having means to engage said pins to advance the racks and wheels, means controlled by said general operator for advancing the units wheel an extra step, and tens-carrying mechanism.

24. The combination of a system of computing wheels or devices, racks or members for advancing said computing wheels, said racks provided with settable pins, a key having means to set all the "9" pins, numeral keys numbered from "1" to "9" and having means to return to idle position the "9" pin on any selected rack, and concomitantly set any other pin on said rack, the keys numbered from "1" to "8" controlling respectively the pins from "8" to "1," a general operator having means to engage said pins to advance the racks and wheels, means controlled by said general operator for advancing the units wheel an extra step, and tens-carrying mechanism connected to said general operator to act after the units wheel has been so advanced.

25. The combination with a system of computing wheels or devices, racks or members for advancing said computing wheels; said racks provided with settable pins, a key having means to set all the "9" pins, a set of numeral keys numbered from "1" to "9," and having means to return to idle position the "9" pin on any selected rack, and concomitantly set any other pin on said rack, the key of lowest number having means to set pins next to the "9" pins, the next key having means to set pins in the second row from the "9" pins, and so on, the key numbered "9" not being connected to any pin, a general operator having means to engage said pins to advance the racks and wheels, means controlled by said general operator for advancing the units wheel, and tens-carrying mechanism effective after the units wheel is so advanced.

26. The combination with a system of computing wheels or devices, of racks or members for advancing said computing wheels, said racks provided with settable pins, means to set all the "9" pins concomitantly, eight links or bars movable to set any of the remaining rows of pins, one link for each row, keys numbered from "1" to "8" and connected to said links in reverse order, the key numbered "1" connected to the link for setting the "8" pins, and so on, a numeral key marked "9", means for enabling any of said keys to return the "9" pin to normal position when setting another pin, a general operator having means to engage the pins to advance the racks and wheels automatically, means for advancing the units wheel one extra step, and tens-carrying mechanism.

27. The combination with a system of computing wheels or devices, of racks or members for advancing said computing wheels, each rack provided with nine settable pins, means to set all the "9" pins concomitantly, eight links or bars movable to set any of the remaining rows of pins, one link for each row, keys numbered from "1" to "9", rock arms controlled respectively by the first eight keys and connected to said links, the rock arm connected to the key numbered "1" controlling the link for setting the "8" pins, and so on, means for enabling any of said keys to return the "9" pin to normal position when setting another pin, a general operator having means to engage the pins to advance the racks and wheels, automatic means for advancing the units wheel one step, and tens carrying mechanism.

28. The combination with a system of computing wheels or devices, of racks or members for advancing said computing wheels, each rack provided with nine settable pins, means to set all the "9" pins concomitantly, eight links or bars movable to set any of the remaining rows of pins, one link for each row, keys numbered from "1" to "9", rock shafts connected in order to the first eight keys, rock arms on said shafts for controlling said links, the latter being connected in inverted order to the keys, the link connected to the key numbered "1" being movable by said keys to set the "8" pins, and so on, a universal link or bar movable to return all the "9" pins to normal positions, additional rock arms on said shafts for moving said universal link, a general operator having means to engage the pins to advance the racks and wheels, automatic means for advancing the units wheel an extra step, and tens-carrying mechanism.

29. An adding and subtracting mechanism comprising a system of computing wheels, individual operators for advancing said wheels, numeral keys, a general operator for advancing said operators and wheels in a single direction, devices for coöperating with said general operator to advance all of the wheels ten spaces at a subtraction operation, connections from said keys to certain of said devices for variably controlling said operators, so that said general operator will advance said wheels variably-reduced extents at a subtraction operation, and other connections from said keys to said devices for controlling said operators, so that the general operator will advance the operators at an adding operation.

30. An adding and subtracting mechanism comprising numeral keys, a system of computing wheels, individual operators for advancing said wheels, settable members connected to said individual operators, a general operator for advancing said operators and wheels in a single direction, means for setting certain of said members for coöperation with said general operator to effect an advance of all the wheels ten spaces at a subtraction operation, connections from said keys to control certain of said members for variably reducing the extent to which any selected wheel may be advanced by the general operator at a subtraction operation, and other connections from said keys for controlling certain of said members for determining the extents to which the wheels shall be advanced by the general operator at the adding operation.

31. An adding and subtracting mechanism comprising numeral keys, a system of computing wheels, a general operator, a tens-carrying mechanism, indexing devices for determining the extents of rotation of the wheels by the general operator, means to enable said numeral keys to operate said indexing devices to perform addition, means to enable said keys to operate said indexing devices, so that the general operator will rotate said wheels to an extent one less than the complement of the operated key to perform subtraction, means ineffective at the adding operation but brought into use at will for automatically setting certain of said indexing devices, so that the general operator will advance nine steps at the subtraction operation all wheels that are not affected by the numeral keys, and means for advancing the units numeral wheel by the general operator an extra step automatically at each subtraction operation.

32. An adding and subtracting mechanism comprising numeral keys, a system of computing wheels, means including indexing devices, a general operator, and a tens-carrying mechanism for enabling addition to be performed, a subtraction key, means controlled by said subtraction key for enabling said numeral keys to set said indexing devices to control said general operator, to advance any selected number wheels each to an extent equal to one less than the complement of the numeral key operated, means controlled by said subtraction key for controlling said indexing devices to control said general operator, to advance nine steps all of the remaining wheels, and means also controlled by said subtraction key for advancing the units wheel an extra step prior to the tens-carrying operation.

33. An adding and subtracting mechanism comprising a system of numeral wheels, a set of numeral keys from "1" to "9", indexing devices set by said numeral keys, tens-carrying means to enable said keys to set said indexing devices to perform addition, a subtraction key, a shiftable device connected thereto for altering the manner in which said keys control said indexing devices, so that when said subtraction key is operated, said numeral keys control said indexing devices to advance any selected wheels 8, 7, 6, 5, 4, 3, 2 or 1 steps according to whether the "1", "2", "3", "4", "5", "6", "7" or "8" key is operated, means also coöperating with said shiftable device for controlling the said indexing devices, so that the remaining wheels are advanced nine steps, and means for advancing the units wheel an extra step automatically prior to the completion of the tens-carrying operation.

34. An adding and subtracting mechanism comprising number wheels, a system of numeral keys, settable indexing devices for each wheel, key-controlled means for setting said indexing devices, means coöperating therewith for performing addition, a subtraction key, means associated with the subtraction key and controlled by the numeral keys for setting for any selected wheel an indexing device in value equal to one less than the complement of the key operated, means controlled by the subtraction key to set the indexing devices for all of the remaining wheels, means for operating said wheels, tens-carrying mechanism, and means for automatically advancing the units wheel an extra step.

35. The combination of a series of numeral keys numbered from "1" to "9", a system of number wheels, settable pins for each wheel, means to coöperate with said keys for setting said pins and performing addition, a subtraction key, means controlled by the same keys for setting for any selected wheel a pin whose value is equal to one less than the complement of the key operated, means controlled by the subtraction key to set "9" pins for all of the remaining wheels, means for automatically advancing the units wheel an extra step, and a tens carrying device called into operation after said units wheel has advanced the extra step.

36. A combined adding and subtracting mechanism including numeral keys, a system of number wheels or devices, settable pins for each wheel, a general operator to advance the wheels to perform addition, a subtraction key or fingerpiece, means controlled by said subtraction key for setting "9" pins for all the wheels concomitantly, numeral key operated means also connected to or controlled by said subtraction key for restoring the "9" pin of any number wheel to normal idle position and concomitantly setting for the same wheel a pin whose value is one less than the complement of the operated key, a tens-carrying mechanism, and means controllable jointly by said subtraction key and said general operator to advance the units wheel an extra step prior to the completion of the tens-carrying operation.

37. A combined adding and subtracting mechanism including a set of numeral keys, a system of number wheels, a single set of settable pins for each wheel, a general operator to advance said wheels by means of said pins to perform addition, a subtraction key, a shiftable device connected to said subtraction key, means controlled by said shiftable device for setting all the "9" pins in said set, means also connected to said shiftable device for restoring the "9" pin of any number wheel to normal idle position and concomitantly setting for the same wheel a pin whose value is one less than the complement of the operated key, means connected to said general operator and to said subtraction key for advancing the units wheel automatically an extra step, and a tens carrying mechanism called into action by said general operator after such advance of the units wheel.

38. An adding and subtracting mechanism comprising a series of numeral keys numbered from "1" to "9", a system of number wheels, nine pins for each wheel settable by said keys, a general operator to advance the number wheels to points determined by the set pins, to perform addition, tens-carrying mechanism, a subtraction key or controller, means controlled by said subtraction key for setting the "9" pins for all the wheels concomitantly, means controlled by said subtraction key and said numeral keys, to enable the latter to restore the "9" pin of any number wheel, means controlled by said subtraction key and connected to certain of said numeral keys for concomitantly setting a different pin for the same wheel, the keys "1" to "8" being respectively connected to set pins from "8" to "1", and means also controlled by said subtraction key for advancing the units wheel an extra step at or prior to the tens-carrying operation.

39. The combination of a series of numeral keys numbered from "1" to "9," a system of number wheels, individual racks or operating members for said wheels, nine pins on each rack, rack-selecting means, means to enable any of said keys to set the corresponding pin on the selected rack, a general operator to engage the set pins and advance the racks and wheels to perform addition, a tens-carrying mechanism, a subtraction mechanism or device idle at the adding operation but shiftable into use and having means to set all the "9" pins on the racks simultaneously, means dependent upon the subtraction mechanism and controlled by any of said keys to restore the "9" pin on any rack to idle position, said keys being disconnected from said pins and the keys numbered "1" to "8" being respectively connected through said subtraction mechanism to set the pins from "8" to "1," and means also dependent upon the subtraction mechanism for advancing the units wheel an extra step.

40. The combination of a series of numeral keys numbered from "1" to "9," a system of number wheels, individual racks or operating members for said wheels, nine pins on each rack, rack-selecting means, means to enable any of said keys to set the corresponding pin on the selected rack, a general operator to engage the set pins and advance the racks and wheels to perform addition, a tens-carrying mechanism, a subtraction mechanism or device idle at the adding operation but shiftable into use and having means to set all the "9" pins on the racks simultaneously, means dependent upon the subtraction mechanism and controlled by any of said keys to restore the "9" pin on any rack to idle position, said keys being disconnected from said pins and the keys numbered "1" to "8" being respectively connected through said subtraction mechanism to set the pins from "8" to "1," a ratchet for the units wheel in said system, a pawl for said ratchet, and a pawl-operating member having a pin settable by said subtraction mechanism to position to be engaged by said general operator.

41. The combination of a series of numeral keys numbered from "1" to "9," a system of number wheels, individual racks or operating members for said wheels, nine pins on each rack, rack-selecting means, means to enable any of said keys to set the corresponding pin on the selected rack, a general operator to engage the set pins and advance the racks and wheels to perform addition, a subtraction mechanism or device idle at the adding operation but shiftable into use and having means to set all the "9" pins on the racks simultaneously, means dependent upon the subtraction mechanism and controlled by any of said keys to restore the "9" pin on any rack to idle position, said keys being disconnected from said pins and the keys numbered from "1" to "8" being respectively connected through said subtraction mechanism to set the pins from "8" to "1," a ratchet for the units wheel in said system, a pawl for said ratchet, pawl-operating members having a pin settable by said subtraction mechanism to position to be engaged by said general operator, means connected to said general operator to restore all of said pins to normal positions, a lever operable by said pawl-operating member, said pawl connected to said lever to be retracted at the initial stroke of the lever, a spring to advance said pawl and units wheel at the return stroke of the general operator, and a tens-carrying mechanism operable upon the return stroke of said general operator.

42. The combination of numeral keys having numbers from "1" to "9," a system of computing wheels or devices, a set of racks or wheel-operating members, nine pins on each rack, rack-selecting means, nine links or bars normally operable by said keys to set said pins for addition, a general operator to engage said pins to advance the wheels for addition, tens-carrying mechanism, a subtraction mechanism including means independent of said keys for setting all of the "9" pins on said racks concomitantly, means controlled by said subtraction mechanism for disconnecting said keys from said bars, and enabling the keys numbered "1" to "8" to operate the pin-setting bars "8" to "1" respectively, the key numbered "9" being incapable of setting any of said pins at the subtraction operation, means also dependent upon said subtraction mechanism and controlled by any of said keys for restoring to normal idle position the set "9" pin on any selected rack, and means also dependent upon said subtraction mechanism for automatically advancing the units wheel an extra step.

43. The combination of a system of computing wheels or devices, nine numeral keys, individual racks or wheel-operating members, each having nine settable pins, nine links or bars connected to or controlled by said keys respectively for setting the pins on any selected rack, to perform addition, a general operator, tens-carrying mechanism, a shiftable subtraction mechanism, means controlled by said subtraction mechanism for setting all the "9" pins concomitantly, means also controlled by said subtraction mechanism to disconnect said keys from said bars and connect the keys "1" to "8" to the bars "8" to "1" respectively, said subtraction mechanism including a link or bar common to said keys for restoring to idle position the "9" pin on any rack concomitantly with the setting of any pin on the same rack, and means also controlled by said subtraction mechanism for advancing the units wheel an extra step.

44. The combination of a system of computing wheels or devices, numeral keys, a set of pins settable by the keys to limit or determine the extent of rotation of said wheels in the performance of addition, a general operator, tens-carrying mechanism, a shiftable subtraction mechanism or device, means controlled by or connected to said subtraction mechanism for setting all the "9" pins concomitantly, means also controlled by said subtraction mechanism to disassociate said keys from said pins and associate or connect in inverted order such keys as are numbered from "1" to '8" to the pins for "8" to "1" respectively, said subtraction mechanism including means common to all the keys for restoring to idle position any selected "9" pin, and means also controlled by the subtraction mechanism for advancing the units wheel an extra step.

45. The combination of a system of computing wheels, nine numeral keys, individual racks or members to operate the wheels, each rack having nine settable pins, nine rock shafts connected respectively to said keys, arms on said rock shafts, links or bars connected respectively to said arms for setting any of the pins "1" to "9" for the performance of addition, a general operator, tens-carrying mechanism, other rock-arms on said shafts, a shiftable subtraction mechanism or device having means to effect a relative shifting of the rock arms and shafts to disconnect the first set of rock arms and said links or bars and connect rock shafts "1" to "8" in inverted order to links or bars "8" to "1" respectively, means controlled by said subtraction mechanism for setting all of the "9" pins concomitantly, means also controlled by said subtraction mechanism to coöperate with said keys to restore to idle positions the set "9" pin on any rack, and means controlled by said subtraction mechanism for advancing the units wheel an extra step.

46. The combination of a system of computing wheels, nine numeral keys, individual racks or members to operate the wheels, each rack having nine settable pins, nine rock shafts connected respectively to said keys, arms on said rock shafts, links or bars connected respectively to said arms for setting any of the pins "1" to "9" for the performance of addition, a general operator, tens-carrying mechanism, other rock-arms on said shafts, a shiftable subtraction mechanism or device having means to effect a relative shifting of the rock arms and shafts to disconnect the first set of rock arms and said links or bars and connect rock shafts "1" to "8" in inverted order to links or bars "8" to "1" respectively, means controlled by said subtraction mechanism for setting all of the "9" pins concomitantly, said subtraction mechanism including a universal link or bar having projections, arms on said rock shafts idle at the addition operation, said subtraction mechanism including means for enabling the projections to be engaged by the last mentioned arms, means controlled by said link or bar to restore to idle position the "9" pin on any selected rack, and means controlled by the subtraction mechanism for advancing the units wheel one step.

47. The combination of a system of computing wheels, nine numeral keys, individual racks or members for operating the wheels, each rack having nine settable pins, a general operator to engage the set pins and advance the racks and wheels, nine rock-shafts operable respectively by said keys, a row of arms on said rock-shafts, linkages or bars engageable respectively by said arms for setting any of said pins from "1" to "9" for the performance of addition, tens carrying mechanism, a second row of arms on said rock-shafts, said rows intersecting, and the arms in the second row being idle at the addition operation, a shiftable subtraction mechanism or device having means to shift said rock shafts endwise to disconnect the arms in the first row and connect the arms in the second row to the linkages so that the keys "1" to "8" may control in inverse order the linkages "8" to "1", means also controlled by said subtraction mechanism for setting all of the "9" pins concomitantly, and for coöperating with said keys to restore to idle position the set "9" pin on any rack, and means controlled by said subtraction mechanism for advancing the units wheel an extra step.

48. The combination of a system of computing wheels, nine numeral keys, individual racks or members for operating the wheels, each rack having nine settable pins, a general operator to engage the set pins and advance the racks and wheels, nine rock-shafts operable respectively by said keys, a row of arms on said rock-shafts, linkages or bars engageable respectively by said arms for setting any of said pins from "1" to "9" for the performance of addition, tens carrying mechanism, a second row of arms on said rock-shafts, said row intersecting, and the arms in the second row being idle at the addition operation, a shiftable subtraction mechanism or device having means to shift said rock shafts endwise to disconnect the arms in the first row and connect the arms in the second row to the linkages so that the keys "1" to "8" may control in inverse order the linkages "8" to "1", means also controlled by said subtraction mechanism for setting all of the "9" pins concomitantly, a third set of arms on said rock shafts, a bar or linkage extending along said third set of arms and disconnected therefrom at the addition operation, but engageable thereby at the subtraction operation, means controlled by the last mentioned bar or linkage to restore to idle position the "9" pin on any selected rack, and means controlled by the subtraction mechanism for advancing the units wheel an extra step.

49. The combination with a system of numeral wheels, racks to operate them, pins on said racks, links or bars to set the pins, and keys to operate the bars, of a subtraction key, a rod or stem connected thereto, a rock-shaft having an arm to which said stem is connected, a bar on said rock shaft to lift said racks to coöperate with the "9" pin-setting bar to set all of the "9" pins simultaneously, means connected to said subtraction key for disconnecting said number keys from said pin-setting bars or links and connecting the keys from "1" to "8" to the pin-setting bars from "8" to "1" respectively, means to enable any key to restore to normal position the "9" pin on any rack, a general operator, tens-carrying mechanism, and means controlled by said subtraction key for advancing the units wheel an extra step.

50. The combination with a system of numeral wheels, racks to operate them, pins on said racks, links or bars to set the pins, and keys to operate the bars, of a subtraction key, a "9" pin-setting bar controlled thereby, a rod or stem connected to said key, a rock-shaft having an arm to which said stem is connected, a bar on said rock shaft to lift said racks to coöperate with said "9" pin-setting bar to set all of the "9" pins simultaneously, said key after operating said parts being free to return to normal position, means also connected to said subtraction key for disconnecting said number keys from said pin-setting bars or links and connecting the keys from "1" to "8" to the pin-setting bars from "8" to "1" respectively, means to enable any key to restore to normal postion the "9" pin on any rack, a general operator, tens-carrying mechanism, means controlled by said subtraction key for advancing the units wheel an extra step, and a latch to retain said key-disconnecting and connecting means in effective position during subtraction.

51. The combination with a system of numeral wheels, racks to operate them, pins on said racks, bars to set the pins, and keys to control the bars, of a subtraction key, a member operated by said subtraction key to set all of the "9" pins simultaneously, said key after setting said pins being free to return to normal position, means also connected to said subtraction key for disconnecting said number keys from said pin-setting bars, and connecting the first eight keys in inverse order to the first eight pin-setting bars, a latch to retain said key-disconnecting and connecting means in effective position, means to enable any key to restore to normal position the "9" pin on any rack, a general operator, means controlled jointly by said subtraction key and said general operator for advancing the units wheel an extra step, tens-carrying mechanism, and means controlled by said general operator for releasing said latch.

52. The combination of a system of number wheels, a general operator for advancing the same, pins to determine the extent of rotation of the wheels, bars or linkages for setting the pins, endwise shiftable rock shafts connected to said bars, a subtraction key, a transverse shifter bar controlled by said subtraction key and connected to said rock shafts to shift all of them out of connection with said bars and the first eight of said rock shafts into connection with the first eight bars, but in reverse order, means to return said shifted bar and subtraction key to normal positions, means controlled by said subtraction key to set all of the "9" pins, means controlled by any numeral key to restore any "9" pin, tens-carrying mechanism, and means to advance the units wheel an extra step.

53. The combination of a system of number wheels, a general operator for advancing the same, pins to determine the extent of rotation of the wheels, bars or linkages for setting the pins, endwise shiftable rock shafts connected to said bars, a subtraction key, a transverse shifter bar controlled by said subtraction key and connected to said rock shafts to shift all of them out of connection with said bars and the first eight of said rock shafts into connection with the first eight bars, but in reverse order, means to return said shifter bar and subtraction key to normal positions, means controlled by said subtraction key to set all of the "9" pins, a universal bar for restoring any "9" pin to normal position, means on said rock-shafts and shiftable therewith into engagement with said universal bar, tens carrying mechanism, and means to advance the units wheel an extra step.

54. The combination of a system of numeral wheels, racks to operate them, pins to limit the movements of the racks, bars to set the pins, numeral keys to control the bars, a general operator, a subtraction key, means operable by said subtraction key for disconnecting said numeral keys from said pin-setting bars and connecting the first eight keys in inverse order to the first eight pin-setting bars, a latch to retain said disconnecting and connecting means in effective position, means operable by said subtraction key, and returnable to normal position in advance of said key-disconnecting and connecting means, for setting all of the "9" pins, means for operating the units wheel, including a driver, a pin on said driver settable by said subtraction key to position to engage said general operator for advancing the units wheel an extra step, means to enable any numeral key to restore any "9" pin, tens-carrying mechanism, means connected to said general operator for releasing said latch, and means also connected to said general operator for restoring the pin on said driver.

55. The combination of a system of numeral wheels, racks to operate them, pins to limit the movements of the racks, bars to set the pins, numeral keys to control the bars, a general operator, a subtraction key, means operable by said subtraction key for disconnecting said numeral keys from said pin-setting bars and connecting the first eight keys in inverse order to the first eight pin-setting bars, a latch to retain said disconnecting and connecting means in effective position, means operable by said subtraction key, and returnable to normal position in advance of said key-disconnecting and connecting means, for setting all of the "9" pins, means for operating the units wheel, including a driver, a pin on said driver settable by said subtraction key to position to engage said general operator for advancing the units wheel an extra step, means to enable any numeral key to restore any "9" pin, tens-carrying mechanism, means connected to said general operator for releasing said latch, means also connected to said general operator for restoring the pin on said driver, and an error-key mechanism including means to restore to normal positions all the pins, including the "9" pins and the pin on said driver, and also including means to release said latch.

56. The combination of a system of numeral wheels, racks to operate them, pins to limit the movements of the racks, bars to set the pins, numeral keys to control the bars, a general operator, a subtraction key, means operable by said subtraction key for disconnecting said numeral keys from said pin-setting bars and connecting the first eight keys in inverse order to the first eight pin-setting bars, means operable by said subtraction key for setting all of the "9" pins, means for operating the units wheel, including a driver, a pin on said driver settable by said subtraction key to position to engage said general operator for advancing the units wheel an extra step, means to enable any numeral key to restore any "9" pin, and tens-carrying mechanism.

57. The combination of a system of numeral wheels, racks to operate them, pins to limit the movements of the racks, bars to set the pins, numeral keys to control the bars, a general operator, a subtraction key, means operable by said subtraction key for disconnecting said numeral keys from said pin-setting bars and connecting the first eight keys in inverse order to the first eight pin-setting bars, means operable by said subtraction key for setting all of the "9" pins, means for operating the units wheel, including a driver, a pin on said driver settable by said subtraction key to position to engage said general operator for advancing the units wheel an extra step, means to enable any numeral key to restore any "9" pin, tens-carrying mechanism, and an error-key mechanism including means to restore to normal positions all the pins, including the "9" pins and the pin on said driver.

58. The combination with number wheels, of numeral keys, a general operator, pins settable by the numeral keys for determining the extent of rotation of the wheels, a key or finger-piece, means connected to said finger-piece for shifting certain portions of the recited elements from condition to effect addition to condition to effect subtraction, an error key, and means connected to said error key for restoring the set pins and also for restoring the shifted elements to condition to effect addition.

59. The combination with number wheels, of numeral keys, a general operator, pins settable by the numeral keys for determining the extent of rotation of the wheels, a key or finger piece, means actuated by said key or finger-piece for shifting certain portions of the recited elements from condition to effect addition to condition to effect subtraction, an error key, and means for restoring the set pins and also for restoring the shifted elements to condition to effect addition actuable from both said general operator and said error key.

60. The combination with number wheels or devices, of numeral keys, a general operator, means actuated by said general operator for operating the wheels, means controlled by the keys for determining the extent of rotation of the wheels, means for shifting certain portions of said elements from condition to effect addition to condition to effect subtraction, a shiftable ribbon mechanism controlled by said subtraction shifting means, to cause the subtracted number to be printed in a color different from the added numbers, and automatic means controlled by said general operator and effective upon the completion of the subtraction of any number, for restoring said elements to condition to effect addition, and for restoring said shiftable ribbon mechanism to normal conditon.

61. An adding and subtracting mechanism including number wheels, racks to advance the wheels, pins on the racks, a subtraction key having means to lift all the racks simultaneously and to set all the "9" pins on said racks, means for restoring any selected "9" pin and simultaneously setting another pin on the same rack, tens-carrying mechanism, a general operator, and means for automatically advancing the units wheel an extra step.

62. The combination with a typewriting mechanism including numeral keys from "1" to "9," of a computing wheel, a rack bar for rotating said wheel, pins adjustably mounted on said bar and corresponding to said keys from "1" to "9" for determining the extent of rotation of said wheel, means independent of said keys for setting a certain one of said pins, and means operated by said keys for setting the corresponding pin and concomitantly unsetting said previously set pin.

63. The combination with a typewriting mechanism including a carriage and numeral keys, of a computing mechanism including a nest of pins settable at the actuation of said numeral keys to temporarily accumulate the equivalent of a series of numbers struck by said keys, mechanism for determining the character of action of said computing mechanism as to adding or subtracting, means for setting said pins controlled by said second mentioned mechanism, and a key for governing the action of said second mentioned mechanism.

64. The combination with a typewriting mechanism including numeral keys from "1" to "9," of a computing wheel, a rack bar for rotating said wheel, pins adjustably mounted on said bar and corresponding to said keys from "1" to "9" for determining the extent of rotation of said wheel, means independent of said keys for setting a certain one of said pins, and means operated by said keys for setting the corresponding pin and concomitantly unsetting said previously set pin; said certain pin being free from control by its corresponding numeral key.

65. The combination with a typewriting mechanism including a plurality of numeral keys, of a series of computing wheels, a single set of pins for controlling the extent of rotation of said computing wheel for a plurality of different kinds of computations, numeral-key controlled pin-setting mechanism capable of setting said pins in a plurality of different ways to enable different types of computation to be carried on, and means for determining the character of action of said pin-setting mechanism.

66. The combination with one-way rotatable computing wheels, of means for adding numbers thereon, a tens-carrying mechanism, a key or device for shifting certain elements of the adding mechanism from a condition to perform addition to a condition to perform subtraction, and means controlled by said key or device for eliminating a unit carried by said tens-carrying mechanism by any order not involved in the completed computation.

67. The combination with a system of computing devices, of a series of keys numbered 0, 1, 2, 3, 4, 5, 6, 7, 8 and 9, respectively, means for adding values corresponding to the keys operated, tens-carrying mechanism, and a device for shifting the connections between said computing devices and said numeral keys, for adding the complement of the value of the key operated, and for eliminating a unit carried by said tens-carrying mechanism to any order not involved in the completed computation and also controlling means for advancing the units computing device an extra step.

68. The combination with a series of computing wheels, of a series of pin-bearing bars for determining the extent of rotation of said computing wheels, said pins having different values ranging from lowest to highest ultimate values to correspond with the extent of movements of the associated bars determined thereby, means for setting the pins of highest ultimate value on said bars, a series of numeral keys, and numeral-key-controlled means for setting other pins on said bars and concomitantly unsetting the previously set pins of highest ultimate value on said bars.

69. The combination with a series of numeral keys, of preliminary-representing means for affording a setting up of a computation and having a series of denominational elements with members settable thereon to correspond with different digits, said members having values ranging from lowest to highest ultimate values, means for setting all of the members of highest ultimate value on all of the denominational elements, and means actuated by said numeral keys for unsetting the members of highest ultimate value on such of said elements as have other members of different value set up thereon.

70. The combination with a plurality of numeral keys, of means for affording temporarily and en bloc a preliminary representation of all of the digits of a number to be computed, and setting means actuated by said numeral keys for setting up in said preliminary-representing means a computation having a definite discordant relation with the value of the numeral keys actuated.

71. The combination with means for affording a preliminary representation of a computation, of setting means for said preliminary-representing means, a series of numeral keys having different values, and means for adjusting said setting means so that said numeral keys can selectively actuate one of two elements of said setting means, so as to set up in said preliminary-representing means values corresponding to the numeral keys or having a different definite relation thereto.

72. The combination with a preliminary representing mechanism for affording an accumulation of a computation, of setting mechanism for said preliminary-representing mechanism having a series of actuating elements coöperating with parts of said preliminary-representing machanism to set up digits therein, a series of numeral keys for manipulating said actuating elements, and means for shifting the control of certain of said actuating elements from certain of said numeral keys to certain others of said numeral keys.

73. The combination with a preliminary-representing mechanism for accumulating a computation including a series of members settable to correspond with the digits of the computation, linkages for setting said members, keys for actuating said linkages, and means for determining which of said linkages shall be actuated by different ones of said keys, said keys being independently capable of actuating different ones of said linkages at different times.

74. In a computing machine, the combination with devices in which a number may be set up, of a setting mechanism for setting up a computation in said devices, numeral keys for actuating said setting mechanism, means for adjusting said setting mechanism to set numbers according to the values of the numeral keys actuated or according to values other than the numeral keys actuated, and means operable after the operation of the keys has been completed for computing a number set up by the keys.

75. The combination with devices upon which a number may be set up, of a setting mechanism for setting up a computation in said devices, numeral keys for actuating said setting mechanism, means for adjusting said setting mechanism to set up numbers either additively or subtractively, means normally tending to return said setting mechanism to a definite state, and locking means for preventing the return of said setting mechanism to said definite state.

76. The combination with devices upon which a number may be set up, of a series of linkages for setting up a computation in said devices, a series of numeral keys, there being one of said linkages for each of said numeral keys, a rock shaft individual to each of said numeral keys, and a plurality of arms on each of said rock shafts, said arms enabling the actuation of different ones of said linkages by certain individual ones of said numeral keys.

77. The combination with devices upon which a number may be set up, of a series of linkages for setting up a computation in said mechanism, a series of numeral keys, a rock shaft for each of said numeral keys, a plurality of arms on a plurality of individuals of said rock shafts, and means for shifting said rock shafts to vary the connection of said arms with said linkages so that said individual numeral keys may actuate different ones of said linkages.

78. The combination with devices upon which a number may be set up, of a series of linkages for setting up a computation in said devices, a series of numeral keys, a rock shaft for each of said numeral keys, a plurality of arms on a plurality of individuals of said rock shafts, means for shifting said rock shafts to vary the connection of said arms with said linkages so that said individual numeral keys may actuate different ones of said linkages, means for locking said shafts in their adjusted positions, and means for releasing said locking means at the end of a computation.

79. The combination with a plurality of computing wheels, of devices upon which a number may be set up, a general operator for actuating said devices to run up an accumulated computation in said computing wheels, a setting mechanism for setting up digits in said devices, numeral keys for actuating said setting mechanism, means for varying the condition of said setting mechanism so that said numeral keys may actuate the same so as to cause an accumulation of a computation according to one or another of a plurality of different types of computations, means for locking said setting mechanism in an adjusted condition, and means actuated by said general operator for releasing said locking means.

80. The combination with a series of setting linkages, of a series of rock shafts for actuating said linkages, a plurality of said shafts having individually a plurality of arms to coöperate with different ones of said linkages, and a bar for shifting said rock shafts longitudinally thereof to bring different ones of said arms into engagement with different ones of said linkages.

81. The combination with a series of setting linkages, of a series of rock shafts for actuating said linkages, a plurality of said rock shafts having individually a plurality of arms arranged to engage different ones of said linkages at different times, each of said shafts having a groove therein, a shift bar engaging all of said grooves, and means for actuating said shift bar to slide said shafts longitudinally to bring different ones of the arms thereon into engagement with different ones of said linkages.

82. The combination with a series of setting linkages, of a series of rock shafts for actuating said linkages, a plurality of said rock shafts having individually a plurality of arms arranged to engage different ones of said linkages at different times, each of said shafts having a groove therein, a shift bar engaging all of said grooves, means for actuating said shift bar to slide said shafts longitudinally to bring different ones of the arms thereon into engagement with different ones of said linkages, and means for locking said shift bar in different positions.

83. The combination with a plurality of denominational elements, each having a plurality of digit-representing members settable to determine the extent of movement of said elements, said digit-representing members running from lowest to highest value to correspond with the exchange value between each denominational element and the next higher element, of means for concomitantly setting all of the digit members of highest value on all of said denominational elements.

84. The combination with a plurality of denominational elements, each having a plurality of digit-representing members settable to determine the extent of movement of said elements, said digit-representing members running from lowest to highest value to correspond with the exchange value between each denominational element and the next higher element, of means universal to all of the digit members of highest value arranged to set said members concomitantly, and means for shifting all of said denominational elements concomitantly to enable the setting of all of said digit members of highest value concomitantly.

85. The combination with a plurality of denominational elements, each having a plurality of digit-representing members settable to determine the extent of movement of said elements, said digit-representing members running from lowest to highest value to correspond with the exchange value between each denominational element and the next higher element, of means universal to all of the digit members of highest value arranged to set said members concomitantly, means for shifting all of said denominational elements concomitantly to enable the setting of all of said digit members of highest value concomitantly, and means for concomitantly actuating said universal means and said last-mentioned means.

86. The combination with a series of denominational elements, each having a series of digit-representing members thereon ranging from lowest to highest value according to the exchange value between each denominational element and the next higher denominational element, said members being settable to determine the extent of movement of the associated elements, a frame universal to all of the digit members of highest value, of a frame universal to all of the denominational elements, and means for effecting a concomitant coöperating movement of said universal frames to effect a concomitant setting of all of the digit members of highest value.

87. The combination with a series of denominational elements, each having a series of digit-representing members thereon ranging from lowest to highest value according to the exchange value between each denominational element and the next higher denominational element, said members being settable to determine the extent of movement of the associated elements, of a frame universal to all of the digit members of highest value, a frame universal to all of the denominational elements, means for effecting a concomitant coöperating movement of said universal frame to effect a concomitant setting of all of the digit members of highest value, a series of numeral keys, means actuated by said numeral keys for setting others of said digit members, and means for concomitantly unsetting the digit members of highest value with the setting of other digit members on the same denominational elements.

88. The combination with a series of denominational elements, of means coöperating with said elements to accumulate a computation, means for shifting said elements individually to enable the setting up of digits of a computation, and means for shifting all of said elements concomitantly to effect the setting up of the highest digit for each and all of the denominational elements concomitantly.

89. The combination with a series of denominational elements having digit members thereon settable to accumulate the digits of a computation in the several denominational orders, of means for raising said elements individually to enable the setting of the members thereon, and means for raising all of said elements concomitantly to enable the setting of a row of said members, one of which is located on each of said elements.

90. The combination with a computing mechanism arranged either to add or subtract and including means for setting said mechanism for subtraction and locking it in such condition, of a series of computing wheels for receiving a computation, zeroizing mechanism for returning said computing wheels to zero, and means actuated at the actuation of said zeroizing mechanism to return said computing mechanism to its adding state at the return of said computing wheels to zero.

91. The combination with a computing mechanism capable of performing a plurality of different types of computations and having means for shifting between the different types of computations and maintaining the same in one or another condition corresponding to the different types of computation, of correction mechanism for eliminating an error, and means actuated by said correction mechanism for enabling the change in state of said computing mechanism, so that said computing mechanism would be capable of computing in a different type of computation from the one in which it was acting at the time of the actuation of the correction mechanism.

92. The combination with a series of supports, of a series of members settable on said supports to determine the extent of movement thereof, a series of numeral keys, a series of linkages actuated by said numeral keys for determining the set and unset conditions of said members, and means enabling each of said numeral keys to operate three of said linkages.

93. The combination with a series of supports, of a series of members settable on said supports to determine the extent of movement thereof, a series of numeral keys, and a series of linkages for determining the set and unset conditions of said members, and means to enable a concomitant action of a plurality of said linkages to set certain members on certain of said supports and concomitantly unset certain other members on the same support.

94. The combination with a series of bars, of a series of pins on each of said bars settable to determine the extent of movement of said bars, said pins ranging from those corresponding to the smallest movements of said bars to those corresponding to the greatest movements of said bars, means for setting the pins on all of said bars corresponding to the greatest movements of their associated bars concomitantly, means for shifting all of said bars to have said last-mentioned pins set, and a bar for concomitantly actuating both said last two mentioned means.

95. The combination with a series of rack bars, of pins on each of said rack bars, levers connected to certain of said pins, means universal to all of said levers for actuating the same to set the connected pins, means universal to all of said rack bars for lifting the same to enable the setting of said pins, and a bar common to both of said universal means for concomitantly actuating the same.

96. In a combined typewriting and computing machine, the combination of typewriting mechanism, computing mechanism for registering numbers written by said typewriting mechanism, means adjustable by hand at the will of the operator to set said computing mechanism from addition to subtraction, and means for resetting said adjustable means, said resetting means constructed to act automatically at the end of a subtracting operation.

97. The combination with a series of computing wheels, of a series of numeral keys having different numerical values, means for affording a preliminary representation of a number comprising several digits prior to the computation thereof, transferring means for carrying the entire number from said preliminary representation means to said computing wheels, and setting means actuated by said numeral keys to set up in said preliminary representation means the digits of a computation having a certain relation to the values of the numeral keys actuated but different from these values.

98. The combination with a series of computing wheels, of actuating mechanism for said computing wheels, pins settable to determine the extent of movement of said actuating mechanism, a series of numeral keys, and setting mechanism acting as an intermediary between said numeral keys and said pins, enabling the same keys to set pins having corresponding values with the keys, or pins having different values from the keys.

99. The combination with a series of computing wheels, of actuating mechanism for said computing wheels, a series of pins for determining the extent of movement of said actuating mechanism, a series of numeral keys, and setting mechanism for said pins, rendering each pin settable by two different numeral keys of different values.

100. The combination with a series of computing wheels, of actuating mechanism for said computing wheels, a carriage traveling to determine denominational selections of said actuating mechanism, said carriage movable into and out of an adjustable computing zone, subtraction-setting mechanism for enabling a subtracting operation by a rotation of said computing wheels in the same direction as for adding, and automatic means effective at any position of said carriage for boosting in an extra unit to the units computing wheel in a subtracting operation.

101. In a combined typewriting and computing machine, the combination of a typewriting mechanism including a step-by-step moving carriage, computing mechanism for registering numbers written by said typewriting mechanism and including means settable to add or subtract the numbers written, a spring for normally holding said settable means set for addition, a latch for holding said settable means set for subtraction, and automatic means dependent upon the completion of the subtraction operation for tripping said latch.

102. In a combined typewriting and computing machine, the combination of an actuator, a register, a traveling carriage, a device adjustable to set the mechanism for addition and subtraction, a spring for normally holding said device at addition, a latch for holding said device at subtraction, and means operated by the travel of said carriage for tripping said latch.

103. In a combined typewriting and computing machine, the combination with numeral types and keys therefor, and alphabetical types and keys therefor, and a carriage controlled by said keys, and movable into and out of a computing zone, of a computing mechanism controlled by said numeral keys and changeable from addition condition to subtraction condition, a ribbon mechanism, means for concomitantly changing the condition of the computing mechanism and shifting the ribbon, means for restoring the ribbon and also the computing mechanism automatically on completion of the computation, and manual means independent of said automatic means for shifting the ribbon at will, whereby in a computing zone the color of the type impressions indicates the character of the computation, while outside of the computing zone the different colors of ribbon may be brought into use at will independently of the condition of the computing mechanism.

104. The combination with numeral types and keys therefor, of a carriage controllable by said keys and movable into and out of a computing zone, a computing mechanism controllable by said keys and changeable from adding condition to subtracting condition at any part of the run of the carriage, a ribbon mechanism shiftable to bring different colors of ribbon into use, and means having a connection with the carriage and operable at various positions in the run thereof for concomitantly changing the condition of the computing mechanism and bringing a different color of the ribbon into use.

105. A computing typewriter comprising numeral keys, types operated therefrom to print in different zones through a bichrome ribbon, a computing mechanism controlled by the numeral keys to register items, manual means for changing the computing mechanism from addition to subtraction and simultaneously changing the ribbon color, and automatic means for restoring the computing mechanism to addition and restoring the original ribbon color prior to the printing of the next item in the same zone.

106. The combination with a plurality of numeral keys, of a set of computing wheels arranged for computing numbers having an exchange value from one wheel to the next, driving mechanism for rotating said wheels various amounts, said driving mechanism operable to drive said wheels after the operation of said keys, to various extents predetermined by each key operation, and valuating mechanism actuated by said numeral keys and including means shiftable for enabling the rotation of said computing wheels by said driving mechanism different from those corresponding directly to the values of the actuated numeral keys.

107. The combination with a plurality of computing devices, of a plurality of numeral keys, indexing devices settable thereby for controlling the advancement of said computing devices, a general operator, a subtraction key, and means controllable by said subtraction key and said general operator, for advancing all of said computing devices concomitantly a complete cycle regardless of their original positions, said numeral keys controlling the advancement of said computing devices any distance less than a complete cycle.

108. The combination with mechanism for printing numbers, said mechanism including a carriage and a ribbon mechanism, mechanism for registering numbers, said mechanism being capable of the operations of addition and subtraction and comprising a register, actuating means for said register, and a member adjustable with relation to the travel of said carriage to vary the location of the computing zone, of means dependent upon the operation of said registering mechanism for changing the character of arithmetical operation performed in said register and bringing into use a different color of the ribbon, regardless of the adjustment of said zone-controlling member.

109. The combination of a system of number wheels, a carriage, a set of numeral keys controlling said carriage numbered from "1" to "9," step-by-step feeding mechanism for said carriage under the control of said keys to feed the carriage from highest to lowest denomination, means to operate said wheels according to the numbers set by said keys, means coöperative with said numeral keys to advance any selected wheels 8, 7, 6, 5, 4, 3, 2 or 1 step according to whether the value of the key operated is "1," "2," "3," "4," "5," "6," "7" or "8," including means, settable independently of said keys, for advancing nine steps all of the remaining wheels, and means independent of said carriage for advancing the units wheel an extra step.

110. The combination of a system of number wheels, a carriage, a set of numeral keys numbered from "1" to "9," step-by-step feeding mechanism for said carriage under the control of said keys, to feed the carriage from highest to lowest denomination, a general operator to run into said wheels the numbers set by said keys, a single set of types operated by said keys whether addition or subtraction is being performed, means coöperating with said numeral keys and said general operator to advance any selected wheels, 8, 7, 6, 5, 4, 3, 2 or 1 step according to whether key "1," "2," "3," "4," "5," "6," "7" or "8" is operated, settable means independent of said keys and coöperating with said general operator for advancing nine steps all of the remaining wheels, means coöperating with the general operator for advancing the units wheel an extra step, and carry-over mechanism operated by the general operator after said units wheel has been given said extra step.

HANS HANSON.

Witnesses:
CHARLES R. RAY,
OSMOND W. OLMSTED.

Copies of this patent may be obtained for five cents each, by addressing the "Commissioner of Patents, Washington, D. C."